(12) United States Patent
Broecher et al.

(10) Patent No.: US 8,633,278 B2
(45) Date of Patent: Jan. 21, 2014

(54) BIMOLECULAR INVERSE EMULSION POLYMER

(75) Inventors: Markus Broecher, Muehlheim an der Ruhr (DE); Charlotta Kanto Oeqvist, Kempen (DE); Nathalie Sieverling, Duisburg (DE); Georg Linneweber, Niederkruechten (DE)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 13/264,842

(22) PCT Filed: Apr. 9, 2010

(86) PCT No.: PCT/EP2010/002218
§ 371 (c)(1),
(2), (4) Date: Jan. 12, 2012

(87) PCT Pub. No.: WO2010/118841
PCT Pub. Date: Oct. 21, 2010

(65) Prior Publication Data
US 2012/0101194 A1    Apr. 26, 2012

(30) Foreign Application Priority Data
Apr. 17, 2009  (EP) .................................... 09005503

(51) Int. Cl.
*C08F 265/00* (2006.01)
*C08F 2/32* (2006.01)
*C08F 265/06* (2006.01)
*C08F 265/04* (2006.01)

(52) U.S. Cl.
USPC ............ 525/201; 524/457; 524/758; 524/801

(58) Field of Classification Search
USPC ........................... 525/201; 524/457, 758, 801
See application file for complete search history.

(56) References Cited

U.S. PATENT DOCUMENTS

| 3,979,349 A | * | 9/1976 | Fink et al. ..................... 524/130 |
| 5,292,800 A | | 3/1994 | Moench et al. |
| 6,117,938 A | | 9/2000 | Farinato et al. |
| 2002/0188040 A1 | | 12/2002 | Chen et al. |
| 2004/0034145 A1 | | 2/2004 | Fischer et al. |
| 2005/0183837 A1 | | 8/2005 | Chen et al. |

FOREIGN PATENT DOCUMENTS

| EP | 0 262 945 A2 | 4/1988 |
| EP | 0 807 646 A1 | 11/1997 |
| EP | 0 819 651 | 1/1998 |
| GB | 1 440 168 | 6/1976 |
| WO | WO 02/083743 A1 | 10/2002 |
| WO | 2009 053029 | 4/2009 |

* cited by examiner

*Primary Examiner* — Kelechi Egwim
(74) *Attorney, Agent, or Firm* — Joanne Rossi; Shaorong Chen; Michael Herman

(57) ABSTRACT

The invention relates to novel, stable bi-molecular cationic inverse emulsion polymers (W/O) with both different molecular weights and cationic activities that are assembled via an "in situ" emulsion polymerization of a high molecular weight cationic polymer in the presence of a low molecular weight polymer in the aqueous phase. The low molecular cationic polymer is produced in a pre-polymerization in solution. The novel, stable cationic water-in-oil emulsion is easy invertible and useful as flocculant, dewatering aid and retention aid in papermaking.

16 Claims, 5 Drawing Sheets

BIMOLECULAR INVERSE EMULSION POLYMER

FIELD OF THE INVENTION

The invention relates to water-in-oil polymer dispersions that are useful as flocculants, dewatering (drainage) aids and retention aids in papermaking.

BRIEF DESCRIPTION OF THE PRIOR ART

Conventional emulsion polymerization generally involves an oil phase finely dispersed in a continuous water phase (oil-in-water polymer dispersion).

In inverse emulsion polymerization, water-soluble polymers are produced in a dispersed water phase within a continuous oil phase (water-in-oil polymer dispersion). The polymer formed remains in the dispersed water droplets and does not significantly affect the viscosity of the emulsion. The products contain polymers with a high average molecular weight but exhibit low viscosities. This not only offers an advantage over ordinary emulsions but offers an advantage over forming a dry product. This is because the inverse emulsion is of low viscosity for easy handling and can be quite concentrated for easy transportation. It is easily possible to dilute with a suitable quantity of water and break the emulsion. When the water content of the water-in-oil polymer dispersion is comparatively high, only minor amounts of water are needed in order to invert the water-in-oil emulsion (w/o) into an oil-in-water emulsion (o/w). Since the polymer is formed in small droplets in the inverse emulsion and is already in solution, it easily disperses in the water thereby dramatically increasing the viscosity.

When dispersing the inverse emulsion into an aqueous system, the amount of water suddenly increases. This causes the polymer coils to unfold and in consequence, the viscosity of the system is substantially increased, although the emulsion is substantially diluted. For example, when pouring 1 ml of a water-in-oil emulsion into a volume of 50 ml of water (dilution factor 50) the viscosity of the resulting oil-in-water emulsion is still increased, e.g. 3-fold.

Water-in-oil polymer dispersions containing water-soluble homopolymers and water-soluble copolymers are already widely used today, for example as flocculation agents in the sedimentation of solids, in particular in water and process water treatment or effluent treatment, in raw material extraction, chiefly of coal, aluminum and petroleum, or as auxiliary agents in the sugar industry and in paper production.

In the manufacture of paper, a papermaking furnish, i.e. an aqueous slurry of cellulosic fiber having a water content of usually more than 95 wt.-% is formed into a paper sheet typically having a water content of less than 5 wt.-%. Hence the dewatering and retention aspects of papermaking are important to the efficiency and cost of the manufacture.

Dewatering by sedimentation is the preferred method of drainage because of its relatively low cost. After gravity drainage further methods are used for dewatering, for instance vacuum, pressing, felt blanket blotting and pressing, evaporation and the like. In actual practice a combination of such methods is employed to dewater, or dry, the sheet to the desired water content. Since gravity drainage is both the first dewatering method employed and the least expensive, an improvement in the efficiency of this drainage process will decrease the amount of water required to be removed by other methods and hence improve the overall efficiency of dewatering and reduce the cost thereof.

Various chemical additives have been utilized in an attempt to increase the rate at which water drains from the formed sheet, and to increase the amount of fines and filler retained on the sheet. Flocculants and drainage aids are extensively used to optimize the separation of the solid phase from the liquid phase in the aqueous suspensions. The use of high molecular weight water-soluble polymers is a significant improvement in the manufacture of paper. These high molecular weight polymers act as flocculants, forming large flocs which deposit on the sheet. They also aid in the dewatering of the sheet.

These high molecular weight water-soluble polymers may be employed as, e.g., water-in-oil polymer dispersions (w/o) or water-in-water polymer dispersions (w/w).

Paper is a complex mixture of fiber, filler and other functional and process additives. These additives are incorporated in the sheet to deliver desired properties such as strength, sizing, opacity, etc. Retention programs are an essential component of any modern wet end chemistry regime because retaining these process and functional additives in the sheet as it is formed not only ensures that the desired sheet properties are met but also ensures good cost control. Retention programs can range from a single-component product to a complex program consisting of multiple components added at multiple addition points throughout the wet end.

Designing a retention program to provide high ash and fines retention, while not adversely impacting formation, drainage and machine runnability is the hallmark of an excellent retention program, and meeting this challenge has been the focus of much R&D work. To date, a variety of multi-component programs consisting of coagulants, starch, flocculants and microparticles (silica, bentonite, etc.) have demonstrated the ability to deliver these results, but cost and complexity limit their utility.

For example, U.S. Pat. No. 5,292,800 discloses water-in-oil emulsions of water-soluble or water-swellable polymers, in which the oil phase of the emulsion consists of not less than 50% by weight of an oil of vegetable or animal origin. The water-in-oil polymer emulsions can be used as retention agents and drainage aids in the production of paper, board and cardboard.

U.S. Pat. No. 6,117,938 discloses water-in-oil polymer emulsions in which the aqueous phase comprises a blend of high molecular weight, water-soluble cationic structured polymers with high molecular weight, water-soluble, cationic polymers which either are linear or which have a lower degree of structure. The polymer blends are useful for the drainage of cellulosic suspensions such as those found in paper production.

EP-A 0 262 945 discloses the formation of homogeneous blends of different water soluble polymer types by forming one of the polymers from monomeric starting material by polymerization in a solution of the other polymer. A blend of a polyamine polymer with a water-soluble polyamine, which is made by polymerization of suitable amino or halogen compounds, often together with dimethylamine, with epichlorhydrin, is of particular value for sizing paper.

US 2004/0034145 discloses a method for manufacturing a water-in-water polymer dispersion containing polymer A and at least one polymeric dispersant B, according to which monomers, which are dispersed in an aqueous phase containing water-soluble dispersant B, are subjected to radical polymerization. The obtainable water-in-water polymer dispersions are excellent retention agents and drainage aids in papermaking.

WO 02/083743 and US 2005/0183837 disclose a water-soluble interjacent complex that includes a first water-soluble polymer and one or more water-soluble monomers polymerized to form a second water-soluble polymer in the presence of the first water-soluble polymer. The interjacent complexes can be used in paper manufacture. The interjacent complex is added to at a suitable location on the paper machine to aid in forming the sheet and promoting dewatering of the formed sheet.

EP 819 651 discloses a sludge dewatering composition that is prepared by (i) forming an aqueous solution of a water soluble nonionic monomer, a cationic co-monomer, and a cationic polymer, (ii) emulsifying the aqueous solution in a sufficient quantity of hydrocarbon oil to form a water-in-oil emulsion, and (iii) polymerizing the monomers.

EP 807 646 discloses a process for preparing a water-absorbent resin which enables the water-absorbent resin to ensure the reduction in the release amount of liquid and the increase in the liquid diffusibility. In the preparation process, the water-absorbent resin is prepared by polymerization of a water-soluble ethylenic unsaturated monomer. The polymerization of the water-soluble ethylenic unsaturated monomer is allowed to take place in the presence of a water-absorbent resin having a water-absorbing rate different from that of a water-absorbent resin resulting from polymerization of the water-soluble ethylenic unsaturated monomer. In a preferred mode, the polymerization is performed by a reversed-phase suspension polymerization method.

US 2002/188040 discloses a water-soluble interjacent complex that includes a first water-soluble polymer and one or more water-soluble monomers polymerized to form a second water-soluble polymer in the presence of the first water-soluble polymer. The water-soluble interjacent complex forms a solution in water that is free of insoluble polymer particles. The interjacent complexes may be used to treat a waste sludge by adding an effective amount thereof to the waste sludge. The interjacent complexes may also be used in making paper by adding an effective amount thereof to a pulp or a forming sheet at a suitable location on a paper making machine. The interjacent complexes may further be used as a rheology modifier in aqueous systems by adding an effective amount thereof to an aqueous medium to effect a desired viscosity, rheology, or flow curve property.

There is continuing need to develop new retention and dewatering (drainage) aids to increase the efficiency of pulp or paper manufacture.

SUMMARY OF THE INVENTION

It has been surprisingly found that water-in-oil polymer dispersions exhibiting improved retention and dewatering (drainage) characteristics are obtainable by a process for the preparation of a water-in-oil polymer dispersion comprising the steps of
(a) preparing a water-in-oil monomer dispersion comprising
water;
an oily substance;
a water-in-oil emulsifier;
a first cationic polymer derived from a monomer mixture comprising one or more cationic monomers, preferably (alk)acrylic acid derivatives, and one or more non-ionic monomers, preferably radically polymerizable, ethylenically unsaturated non-ionic monomers, wherein the content of cationic monomers is at most 95 wt.-%, based on the total weight of monomers;
a radically polymerizable cationic monomer, preferably a radically polymerizable cationic (alk)acrylic acid derivative; and
optionally, one or more radically polymerizable, ethylenically unsaturated co-monomers; and
(b) radically polymerizing the radically polymerizable cationic monomer, preferably (alk)acrylic acid derivative, and the optionally present one or more radically polymerizable, ethylenically unsaturated co-monomers thereby yielding a second cationic polymer.

The in situ polymerization of the radically polymerizable cationic monomer, preferably a radically polymerizable cationic (alk)acrylic acid derivative, in the water-in-oil monomer dispersion containing the first cationic polymer yields a water-in-oil polymer dispersion containing two different cationic polymers in admixture, namely the first cationic polymer as well as the second cationic polymer. The inverse emulsion technology provides a method of achieving higher active concentration of the flocculant and a higher molecular weight compared to the water-in-water dispersion technology (w/w).

Water-in-oil polymer dispersions of this type are not obtainable by polymerizing the monomers in absence of the first cationic polymer and adding the first cationic polymer thereafter, but require the presence of the first cationic polymer during the polymerization reaction.

Otherwise, different products exhibiting different properties are obtained. In particular, on the one hand, when adding an aqueous dispersion of a first cationic polymer to a water-in-oil dispersion that has been obtained separately by polymerizing a radically polymerizable cationic monomer and optionally one or more radically polymerizable, ethylenically unsaturated co-monomers, the water contained in the aqueous dispersion of the first cationic polymer increases the water content of the resultant mixture. Typically, the additional water converts the water-in-oil polymer dispersion (w/o) into an oil-in-water polymer dispersion (o/w), thereby dramatically increasing its viscosity, or at least causes the formation of clods or grains. On the other hand, when adding a powder of the first cationic polymer (i.e. in the absence of water in order to not influence the water:oil ratio), it is practically impossible to dissolve the first cationic polymer in the water phase of the water-in-oil polymer dispersion.

The water content of the water-in-oil polymer dispersions according to the invention is well balanced. On the one hand, the water content is sufficiently high in order to allow for polymerization under stable conditions—if the water content during polymerization is too low, dissipation of heat is inefficient and causes severe problems. On the other hand, the water content is sufficiently low in order to keep costs for transportation low and to prevent spontaneous inversion from water-in-oil (w/o) into oil-in-water (o/w).

DETAILED DESCRIPTION OF THE INVENTION

Figure 1:
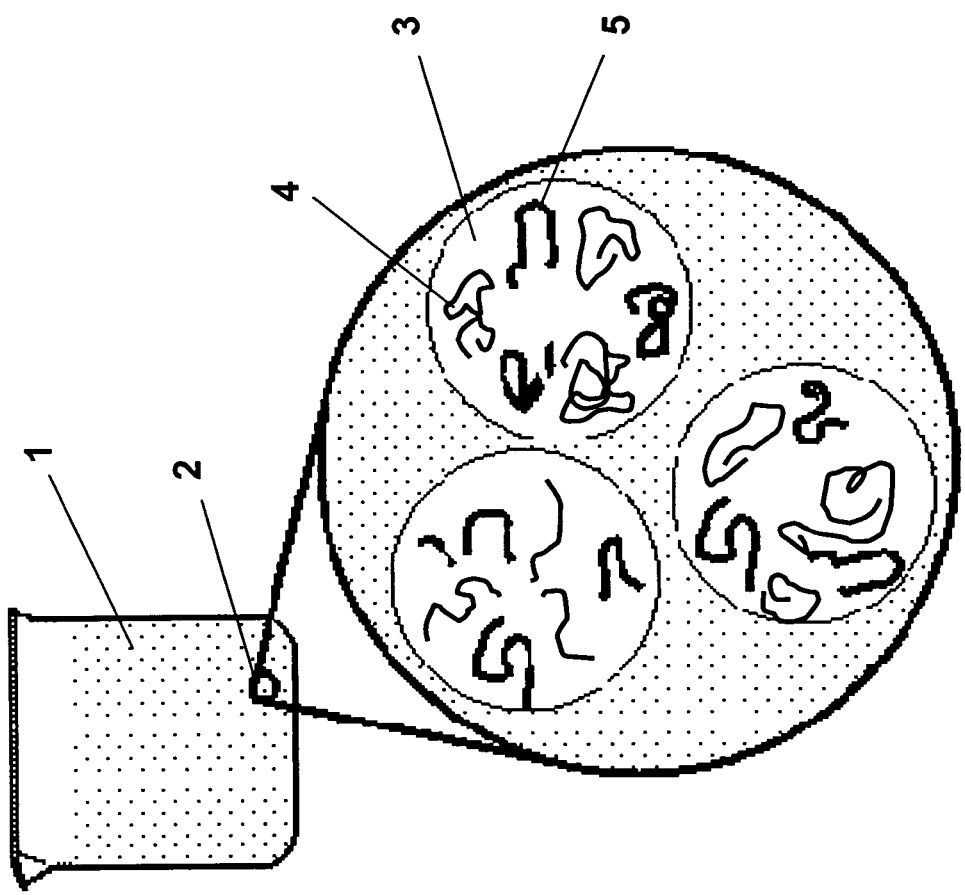
FIG. 1 schematically illustrates the composition of the water-in-oil polymer dispersion according to the invention.

A first aspect of the invention relates to a process for the preparation of a water-in-oil polymer dispersion comprising the steps of
(a) preparing a water-in-oil monomer dispersion comprising water; an oily substance; a water-in-oil emulsifier; a first cationic polymer derived from a monomer mixture comprising one or more cationic monomers and one or more non-ionic monomers, wherein the content of cationic monomers is at most 95 wt.-%, based on the total weight of monomers; a radically polymerizable cationic monomer; and optionally, one or more radically polymerizable, ethylenically unsaturated co-monomers; and
(b) radically polymerizing the radically polymerizable cationic monomer and the optionally present one or more radically polymerizable, ethylenically unsaturated co-monomers thereby yielding a second cationic polymer.

The term "water-in-oil dispersion" is well accepted in the art. Usually, the term refers to dispersions (emulsions) wherein the continuous phase is oil and the discontinuous phase is water, the discontinuous water phase being dispersed in the continuous oil phase. Preferably, the "water-in-oil monomer dispersion" according to the invention comprises at least water, the oily substance, the radically polymerizable cationic monomer, the water-in-oil emulsifier, the first cationic polymer, and optionally, the one or more radically polymerizable, ethylenically unsaturated co-monomers. Similarly, preferably, the "water-in-oil polymer dispersion" according to the invention comprises at least water, the oily substance, the water-in-oil emulsifier, the first cationic polymer and the second cationic polymer obtained by radical polymerization of the radically polymerizable cationic monomer and optionally, the one or more radically polymerizable, ethylenically unsaturated co-monomers. Each of the above components will be more completely described and defined hereinafter.

For the purpose of the specification, the term "water-soluble" preferably refers to a solubility in pure water at ambient temperature of at least 10 g l$^{-1}$, more preferably at least 25 g l$^{-1}$, still more preferably at least 50 g l$^{-1}$, yet more preferably at least 100 g l$^{-1}$, most preferably at least 250 g l$^{-1}$ and in particular at least 500 g l$^{-1}$.

For the purpose of the specification, the term "second cationic polymer" refers to the polymer that is obtainable by an in situ polymerization reaction wherein the water-in-oil monomer dispersion comprising the radically polymerizable cationic monomer and optionally, the one or more radically polymerizable, ethylenically unsaturated co-monomers is polymerized in the presence of the first cationic polymer.

It should be emphasized that the presence of the first cationic polymer during the radical polymerization of the radically polymerizable cationic monomer, preferably a radically polymerizable cationic (alk)acrylic acid derivative, and the optionally present one or more radically polymerizable, ethylenically unsaturated co-monomers is essential for the properties of the resultant water-in-oil polymer dispersion. Identical water-in-oil polymer dispersions are not obtainable by polymerizing the monomers in absence of the first cationic polymer and adding the first cationic polymer thereafter. The first cationic polymer is part of a water-in-oil dispersion into which the second cationic polymer is polymerized from the radically polymerizable cationic monomer, preferably a radically polymerizable cationic (alk)acrylic acid derivative, and the optionally present one or more radically polymerizable, ethylenically unsaturated co-monomers.

The internal structure of the resulting bimolecular polymer system of the first cationic polymer and the second cationic polymer, however, may not be reproduced by simply mixing a first cationic polymer and a polymer separately obtained from the same monomers as the second cationic polymer (see experimental section). It has been surprisingly found that there is a synergism between the first and the second cationic polymer, which is strongly pronounced when the second cationic polymer is polymerized in the presence of the first cationic polymer, but which cannot be reproduced when the first cationic polymer and the second cationic polymer are synthesized separately and combined thereafter.

The situation is further illustrated in FIG. 1 showing beaker 1 with an opaque liquid inside. A small portion 2 of beaker 1 is zoomed in thereby indicating that in said opaque liquid water droplets 3 are dispersed in the continuous oil phase and contain first cationic polymers 4 as well as second cationic polymers 5.

The water-in-oil monomer dispersion according to the invention comprises water, preferably deionized water. The water content may vary from 0.01 to 99.99 wt.-%. Preferably, the water content is within the range of from 10 to 90 wt.-%, more preferably 15 to 85 wt.-%, still more preferably 20 to 80 wt.-%, yet more preferably 25 to 75 wt.-%, most preferably 30 to 70 wt.-% and in particular 35 to 65 wt.-%, based on the total weight of the water-in-oil monomer dispersion. In a preferred embodiment, the water content is within the range of from 30 to 50 wt.-%, more preferably 32 to 48 wt.-%, still more preferably 34 to 46 wt.-%, yet more preferably 36 to 44 wt.-%, most preferably 38 to 42 wt.-% and in particular 39 to 41 wt.-%, based on the total weight of the water-in-oil monomer dispersion.

The water-in-oil monomer dispersion according to the invention further comprises one or more oily substances. Preferably, the oily substance is an inert organic liquid substantially immiscible with water (oil phase). In this regard, "substantially immiscible with water" means that the solubility of the pure oily substance in pure water at ambient temperature is preferably below 10 mg l$^{-1}$, more preferably below 1.0 mg l$^{-1}$, still more preferably below 0.1 mg l$^{-1}$, yet more preferably below 0.01 mg l$^{-1}$, most preferably below 1.0 10$^{-3}$ mg l$^{-1}$ and in particular below 1.0 10$^{-4}$ mg l$^{-1}$. The term "inert" means that the oily substance as such preferably does not contain radically polymerizable ethylenically unsaturated functional groups.

The content of the oily substance may vary from 0.01 to 99.99 wt.-%. Preferably, the content of the oily substance is within the range of from 0.1 to 60 wt.-%, more preferably 1.0 to 55 wt.-%, still more preferably 2.5 to 50 wt.-%, yet more preferably 5.0 to 45 wt.-%, most preferably 10 to 40 wt.-% and in particular 15 to 35 wt.-%, based on the total weight of the water-in-oil monomer dispersion. In a preferred embodiment, the content of the oily substance is within the range of from 14 to 34 wt.-%, more preferably 16 to 32 wt.-%, still more preferably 18 to 30 wt.-%, yet more preferably 20 to 28 wt.-%, most preferably 22 to 26 wt.-% and in particular 23 to 25 wt.-%, based on the total weight of the water-in-oil monomer dispersion.

The oily substance may be a substantially pure compound or a mixture of various compounds. The oily substance can be any inert aliphatic and/or aromatic hydrophobic liquid which does not interfere with the radical polymerization reaction. Examples of such hydrophobic liquids include benzene, xylene, toluene, mineral oils, paraffins, isoparaffinic oils, kerosenes, naphtas, waxes, vegetable oils, and the like, and mixtures thereof. Preferably, the oily substance is a linear, cyclic and/or branched hydrocarbon, preferably containing 6 to 30 carbon atoms, more preferably 8 to 24 carbon atoms, still more preferably 10 to 22 carbon atoms, most preferably 12 to 20 carbon atoms and in particular 14 to 18 carbon atoms. Preferably the hydrocarbon is aliphatic. Preferably, the oily substance has a density below 1.0 g ml$^{-1}$, more preferably below 0.9 g ml$^{-1}$, still more preferably below 0.85 g ml$^{-1}$, most preferably below 0.83 g ml$^{-1}$ and in particular below 0.82 g ml$^{-1}$. Preferably, the oily substance has a pour point (solidifying point) within the range of from −150° C. to 50° C., more preferably −120° C. to 20° C., still more preferably −100° C. to 0° C., most preferably −90° C. to −50° C. and in particular −80° C. to −60° C.

In a preferred embodiment, the oily substance comprises one or more aliphatic hydrocarbons selected from the group consisting of dodecane, tridecane, tetradecane, pentadecane, hexadecane, heptadecane, octadecane, nonadecane and eicosane, hexadecane being particularly preferred. A suitable oily substance is a mixture of $C_{16}$-$C_{20}$ hydrocarbons which is preferably free of aromatics and preferably comprises not more than 2 wt.-% $C_{15}$-hydrocarbons, at least about 60 wt.-% $C_{16}$-hydrocarbons and not more than about 40 wt.-% $C_{17}$-hydrocarbons.

In another preferred embodiment, the oily substance comprises an oil of vegetable or animal origin, such as mono-, di- and triglycerides, pure or as a mixture, for example in the form of oily extracts of natural products, for example olive oil, soybean oil, sunflower oil, castor oil, sesame oil, corn oil, groundnut oil, rapeseed oil, linseed oil, almond oil, colza oil, safflower oil, and their raffinates, for example hydrogenated or partially hydrogenated products thereof and/or their esters, in particular methyl and ethyl esters. The oily substance may also comprise a mixture of aliphatic hydrocarbons and vegetable oils.

In still another preferred embodiment, the oily substance comprises fatty acid esters. Esters of linear saturated fatty acids, in particular fatty acids having an alkyl chain length of more than 11 carbon atoms, preferably lauric, myristic, palmitic, stearic and oleic acid, with alcohols are particularly preferably used. The fatty acid esters are used alone or preferably in combination with a hydrocarbon or a mixture of hydrocarbons.

The water-in-oil monomer dispersion according to the invention further comprises one ore more water-in-oil emulsifiers. An emulsifier is a substance which stabilizes an emulsion, frequently a surfactant. Preferably, the water-in-oil emulsifier has a HLB (hydrophilic-lipophilic balance) value within the range of from 2 to 9, more preferably 3 to 8, still more preferably 3.5 to 7.5, most preferably 4 to 7 and in particular 4.0 to 6.5 (for the definition of the HLB value, see W. C. Griffin, Journal of the Society of the Cosmetic Chemist, 1 (1950), 311). Preferably, the content of the water-in-oil emulsifier is within the range of from 0.01 to 25 wt.-%, more preferably 0.1 to 10 wt.-%, still more preferably 0.5 to 5.0 wt.-%, yet more preferably 1.0 to 4.0 wt.-%, most preferably 1.5 to 3.5 wt.-% and in particular 1.8 to 3.0 wt.-%, based on the total weight of the water-in-oil monomer dispersion. Preferably, the relative weight ratio of the oily substance to the water-in-oil emulsifier is within the range of from 30:1 to 2:1, more preferably 25:1 to 3:1, most preferably 20:1 to 4:1 and in particular 15:1 to 5:1.

Suitable water-in-oil emulsifiers are known to the skilled artisan. Anionic, cationic, zwitterionic or non-ionic surfactants may be used as water-in-oil emulsifier, non-ionic surfactants being preferred. Examples of water-in-oil emulsifiers include alkoxylated reaction products of glycidyl ethers with polyhydric alcohols; fatty esters of mono-, di- and polyglycerols, such as monooleate, dioleate, monostearate, distearate and palmitate stearate; sorbitan fatty esters, such as sorbitan monooleate, sorbitan dioleate, sorbitan trioleate, sorbitan monostearate and sorbitan tristearate; fatty esters of pentaerythritol, such as pentaerythrityl monomyristate, pentaerythrityl monopalmitate or pentaerythrityl dipalmitate; polyethylene glycol sorbitan fatty esters, such as the monooleates; polyethylene glycol mannitol fatty esters, such as monooleates and trioleates; glucose fatty esters, such as glucose monooleate and glucose monostearate; trimethylolpropane distearate; reaction products of isopropylamide with oleic acid; glycerol sorbitan fatty esters; alkanolamides, hexadecyl sodium phthalate and decyl sodium phthalate. Preferably, the water-in-oil emulsifier is selected from the group consisting of sorbitan fatty acid esters and polyoxyethylene sorbitan fatty acid esters.

In a preferred embodiment, the water-in-oil monomer dispersion according to the invention further comprises a second emulsifier. Preferably, the second emulsifier has a HLB (hydrophilic-lipophilic balance) value within the range of from 6 to 17, more preferably 7 to 16, still more preferably 8 to 15, most preferably 9 to 14 and in particular 10 to 13. Preferably, the content of the second emulsifier is within the range of from 0.005 to 25 wt.-%, more preferably 0.01 to 10 wt.-%, still more preferably 0.05 to 5.0 wt.-%, yet more preferably 0.1 to 2.0 wt.-%, most preferably 0.3 to 1.5 wt.-% and in particular 0.5 to 1.0 wt.-%, based on the total weight of the water-in-oil monomer dispersion.

Examples of second emulsifiers include ethoxylated alcohols, such as fatty alcohol ethoxylates; fatty esters of mannitol, such as mannityl monolaurate or mannityl monopalmitate; ethoxylated alkylamines; and alkylphenol ethoxylates.

The water-in-oil monomer dispersion according to the invention further comprises a first cationic polymer derived from a monomer mixture comprising one or more non-ionic monomers. The water-in-oil monomer dispersion may contain more, e.g. two or three different cationic polymers. The content of the cationic monomers in wt.-% relative to the total weight of all monomers from which the first cationic polymer is derived corresponds to the cationicity of the first cationic polymer ($+_{FCP}$). The content of cationic monomers (cationicity) is at most 95 wt.-%, preferably at most 90 wt.-%, more preferably at most 85 wt.-%, still more preferably at most 80 wt.-%, yet more preferably at most 75 wt.-%, most preferably at most 70 wt.-% and in particular at most 70 wt.-%, based on the total weight of monomers.

In a preferred embodiment, the content of cationic monomers (cationicity, $+_{FCP}$) is 30±20 wt.-%, more preferably 30±15 wt.-%, still more preferably 30±10 wt.-% and most preferably 30±5 wt.-%, based on the total weight of monomers. In another preferred embodiment, the content of cationic monomers (cationicity, $+_{FCP}$) is 40±30 wt.-%, more preferably 40±25 wt.-%, still more preferably 40±20 wt.-%, yet more preferably 40±15 wt.-%, most preferably 40±10 wt.-% and in particular 40±5 wt.-%, based on the total weight of monomers. In still another preferred embodiment, the content of cationic monomers (cationicity, $+_{FCP}$) is 50±30 wt.-%, more preferably 50±25 wt.-%, still more preferably 50±20 wt.-%, yet more preferably 50±15 wt.-%, most preferably 50±10 wt.-% and in particular 50±5 wt.-%, based on the total weight of monomers. In yet another preferred embodiment, the content of cationic monomers (cationicity, $+_{FCP}$) is 60±20 wt.-%, more preferably 60±15 wt.-%, still more preferably 60±10 wt.-% and most preferably 60±5 wt.-%, based on the total weight of monomers.

Preferably, the first cationic polymer is water-soluble or water-swellable. Preferably, the content of the first cationic polymer ($C_{FCP}$) is within the range of from 0.01 to 15 wt.-%, more preferably 0.1 to 12 wt.-%, still more preferably 0.5 to 10 wt.-%, yet more preferably 1.0 to 9.0 wt.-%, most preferably 3.0 to 8.0 wt.-% and in particular 4.5 to 6.5 wt.-%, based on the total weight of the water-in-oil monomer dispersion.

In a preferred embodiment, the content of the first cationic polymer ($C_{FCP}$) is 8±6 wt.-%, more preferably 8±5 wt.-%, still more preferably 8±4 wt.-%, yet more preferably 8±3 wt.-%, most preferably 8±2 wt.-%, and in particular 8±1 wt.-%, based on the total weight of the water-in-oil monomer dispersion. In another preferred embodiment, the content of the first cationic polymer ($C_{FCP}$) is 7±6 wt.-%, more preferably 7±5 wt.-%, still more preferably 7±4 wt.-%, yet more preferably 7±3 wt.-%, most preferably 7±2 wt.-%, and in particular 7±1 wt.-%, based on the total weight of the water-in-oil monomer dispersion. In still another preferred embodiment, the content of the first cationic polymer ($C_{FCP}$) is 6±5 wt.-%, more preferably 6±4 wt.-%, still more preferably 6±3 wt.-%, most preferably 6±2 wt.-%, and in particular 6±1 wt.-%, based on the total weight of the water-in-oil monomer dispersion. In yet another preferred embodiment, the content of the first cationic polymer ($C_{FCP}$) is 5±4 wt.-%, more preferably 5±3 wt.-%, most preferably 5±2 wt.-%, and in particular 5±1 wt.-%, based on the total weight of the water-in-oil monomer dispersion.

Preferably, the first cationic polymer exhibits a degree of polymerization of at least 90%, more preferably at least 95%, still more preferably at least 98%, yet more preferably at least 99%, most preferably at least 99.5% and in particular at least 99.9%.

Preferably, the weight average molecular weight $M_w$ of the first cationic polymer is within the range of from 50,000 to 1,500,000 g mol$^{-1}$, more preferably 75,000 to 1,250,000 g mol$^{-1}$, still more preferably 100,000 to 1,000,000 g mol$^{-1}$, yet more preferably 120,000 to 750,000 g mol$^{-1}$, most preferably 140,000 to 400,000 g mol$^{-1}$ and in particular 150,000 to 200,000 g mol$^{-1}$. In a preferred embodiment, the weight average molecular weight $M_w$ of the first cationic polymer is within the range of from 75,000 to 350,000 g mol$^{-1}$.

Preferably, the molecular weight dispersity $M_w/M_n$ of the first cationic polymer is within the range of from 1.0 to 4.0, more preferably 1.5 to 3.5 and in particular 1.8 to 3.2.

Preferably, the first cationic polymer has a product viscosity (spindle I/10 rpm, 20° C., RVT DV-2 viscosimeter) within the range of from 100 to 850 mPas, more preferably 150 to 800 mPas, still more preferably 200 to 750 mPas, yet more preferably 250 to 700 mPas, most preferably 300 to 650 mPas and in particular 350 to 600 mPas.

The first cationic polymer is a copolymer derived from at least one cationic monomer and at least one non-ionic monomer, preferably by radical polymerization.

In this regard, "derived from" means that the polymer backbone of the first cationic polymer comprises repetition units, i.e., repetition units are incorporated in the polymer backbone of the first cationic polymer, which repetition units are formed from the corresponding monomers in the course of the polymerization reaction. For example, when the first cationic polymer is derived from dimethylaminopropyl acrylamide quaternized with methylchloride (DIMAPA quat.), the following repetition unit is incorporated in the polymer backbone:

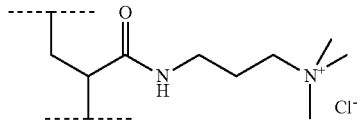

Preferably, the first cationic polymer is derived from one or more cationic monomers, more preferably from a single cationic monomer.

In a preferred embodiment, the first cationic polymer is derived from one or more radically polymerizable, ethylenically unsaturated cationic monomers. Preferably, the first cationic polymer is derived from one or more, radically polymerizable cationic monomers selected from the group consisting of (alk)acrylamidoalkyltrialkyl ammonium halides, (alk)acryloyloxyalkyl trialkyl ammonium halides, alkenyl trialkyl ammonium halides and dialkenyl dialkyl ammonium halides. Preferably, the aforementioned cationic monomers comprise 6 to 25 carbon atoms, more preferably 7 to 20 carbon atoms, most preferably 7 to 15 carbon atoms and in particular 8 to 12 carbon atoms.

Preferably, the first cationic polymer is derived (synthesized/polymerized) from 30 to 95 wt.-% of (alk)acrylamidoalkyltrialkyl ammonium halides, (alk)acryloyloxyalkyl trialkyl ammonium halides, alkenyl trialkyl ammonium halides, and/or dialkenyl dialkyl ammonium halides, and 5 to 70 wt.-% of nonionic monomers, preferably (alk) acrylamide.

In a preferred embodiment, the first cationic polymer is derived from the cationic monomer dialkenyl dialkyl ammonium halide, preferably diallyl dimethyl ammonium halide (DADMAC).

In another preferred embodiment, the first cationic polymer is derived from vinylformamide or vinylamine or a derivative thereof, such as vinylamine quaternized with methyl groups (e.g., CH=CH—N(CH$_3$)$_3$$^+$Cl$^-$).

In still another preferred embodiment, the first cationic polymer is derived from (alk)acrylic acid derivatives. In this regard, the term "(alk)acrylic" refers to acrylic and alkacrylic, e.g., encompasses acrylic and methacrylic. In a preferred embodiment, "(alk)acrylic" is "(meth)acrylic". The term "derivative" refers to reaction products of (alk)acrylic acid with other compounds that are capable of reacting with (alk) acrylic acid under suitable reaction conditions, possibly after activation, such as alkyl alcohols, alkyl thiols and alkyl amines. Said compounds that are capable of reacting with (alk)acrylic acid may bear further functional groups which as such are not capable of reacting with (alk)acrylic acid under the given reaction conditions, such as aryl moieties, heteroaryl moieties, halogen residues, hydroxyl residues, carboxyl residues, tertiary amine residues, quaternized ammonium residues, and the like. Preferred radically polymerizable cationic monomers are cationic radically polymerizable (alk) acrylic acid esters, (alk)acrylic acid thioesters and (alk) acrylic acid amides.

Preferred cationic monomers are (alk)acrylic acid derivatives according to general formula (I)

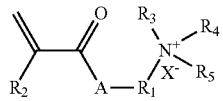

wherein
$R_1$ is linear or branched $C_{1-8}$ alkylene, preferably ethyl, propyl, butyl or pentyl;
$R_2$, $R_3$, $R_4$ and $R_5$ are independently of one another hydrogen, $C_1$-$C_6$ alkyl, preferably methyl, ethyl or propyl; $C_5$-$C_{10}$ aryl, preferably phenyl; or $C_6$-$C_{16}$ arylalkyl, preferably benzyl;
A is O, NH or $NR_6$ with $R_6$ being $C_1$-$C_6$ alkyl, preferably NH; and
X is halogen, pseudohalogen, alkylcarboxylate or alkylsulfate, preferably chlorine.

Preferably, $R_3$, $R_4$ and $R_5$ are identical. In a preferred embodiment, A is O or NH, $R_1$ is ethylene or propylene, $R_2$ is hydrogen or methyl, and $R_3$, $R_4$ and $R_5$ are methyl. The cationic monomer according to general formula (I) may be an ester (A=O), such as dimethylaminoethyl(meth)acrylate quaternized with methylchloride (ADAME quat.). Preferably, however, the monomer according to general formula (I) is an amide (A=NH), particularly dimethylaminopropyl acrylamide quaternized with methylchloride (DIMAPA quat.).

Preferably, protonated or quaternized dialkylaminoalkyl (meth)acrylates or dialkylaminoalkyl(meth)acrylamides with 1 to 3 C atoms in the alkyl or alkylene groups are employed as cationic monomers according to general formula (I), more preferably the methyl chloride-quaternized ammonium salt of dimethylaminopropyl(meth)acrylate, dimethylaminoethyl(meth)acrylate, dimethylaminomethyl (meth)acrylate, dimethyl amino ethyl(meth)acrylamide and/or dimethylaminopropyl(meth)acrylamide. Dimethylaminoethyl acrylate and dimethylaminopropyl acrylamide are particularly preferred.

The basic monomers can be used in a form neutralized with mineral acids or organic acids or in a quaternized form, such quaternization preferably being effected using dimethyl sulfate, diethyl sulfate, methyl chloride, ethyl chloride or benzyl chloride. In a preferred embodiment, monomers quaternized with methyl chloride or benzyl chloride are used.

The first cationic polymer is a copolymer (or terpolymer). It is derived from at least one cationic monomer in combination with at least one non-ionic monomer. Suitable non-ionic monomers include compounds of general formula (II)

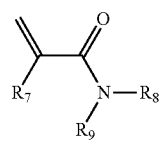

wherein
$R_7$ denotes hydrogen or methyl, and
$R_8$ and $R_9$ mutually independently denote hydrogen, alkyl or hydroxyalkyl with 1 to 5 C atoms.
Examples of non-ionic monomers according to general formula (II) include (meth)acrylamide, N-methyl(meth)acrylamide, N-isopropyl(meth)acrylamide or N,N-substituted (meth)acryl amides such as N,N-dimethyl(meth)acrylamide, N,N-diethyl(meth)acrylamide, N-methyl-N-ethyl(meth) acrylamide, N,N-diisopropyl acrylamide or N-hydroxyethyl (meth)acrylamide.

Further suitable non-ionic monomers include amphiphilic compounds of general formula (III)

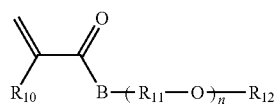

wherein
$R_{10}$ denotes hydrogen or methyl,
$R_{11}$ denotes alkylene with 2 to 6 carbon atoms,
$R_{12}$ denotes hydrogen, alkyl, aryl or aralkyl with 8 to 32 carbon atoms,
B denotes O or $NR_{13}$, with $R_{13}$ denoting alkyl with 1 to 4 carbon atoms, and
n denotes an integer from 1 to 50, preferably 1 to 20.

Examples of amphiphilic compounds of general formula (III) include reaction products of (meth)acrylic acid and polyethylene glycols (10 to 50 ethylene oxide units), which are etherified with a fatty alcohol, or the corresponding reaction products with (meth)acrylamide.

Still further suitable non-ionic monomers include styrene, vinylacetate, vinylformamide and the derivatives thereof.

The first cationic polymer may also be natural or semi-synthetic (i.e. a chemically modified natural polymer). Examples include cationic maltodextrins, dextranes, cyclodextrins, polyamides such as peptides, and the like.

The water-in-oil monomer dispersion may contain additional water-soluble dispersant components in combination with the first cationic polymer. Under these circumstances, the weight ratio of the first cationic polymer to said additional water-soluble dispersant components is preferably within the range of from 1:0.01 to 1:0.5, preferably 1:0.01 to 1:0.3. By way of example, cellulose derivatives, polyvinyl acetates, starch, starch derivatives, dextrans, polyvinylpyrrolidones, polyvinylpyridines, polyethyleneimines, polyamines, polyvinylimidazoles, polyvinylsuccinimides, polyvinyl-2-methylsuccinimides, polyvinyl-1,3-oxazolidin-2-ones, polyvinyl-2-methylimidazolines and/or the respective copolymers thereof with maleic acid, maleic anhydride, fumaric acid, itaconic acid, itaconic anhydride, (meth)acrylic acid, salts of (meth)acrylic acid and/or (meth)acrylamide compounds may be mentioned as additional water-soluble dispersant components.

The water-in-oil monomer dispersion according to the invention further comprises one or more radically polymerizable cationic monomers. Preferably, the radically polymerizable cationic monomers are (alk)acrylic acid derivatives.

Preferably, the radically polymerizable cationic monomer is water-soluble. Preferably, the content of the radically polymerizable cationic monomer is within the range of from 0.1 to 30 wt.-%, more preferably 0.5 to 25 wt.-%, still more preferably 1.0 to 20 wt.-%, yet more preferably 2.5 to 17.5 wt.-%, most preferably 5.0 to 15 wt.-% and in particular 7.0 to 9.0 wt.-%, based on the total weight of the water-in-oil monomer dispersion.

The radically polymerizable cationic monomer may be any cationic monomer that has been described above in connection with the cationic monomers from which the first cationic polymer is derived. For example, suitable radically polymerizable cationic monomers include vinylformamide or vinylamine or a derivative thereof, such as vinylamine quaternized with methyl groups (e.g., $CH{=}CH{-}N(CH_3)_3^+Cl^-$).

In a preferred embodiment, the radically polymerizable cationic monomer is selected from the group consisting of (alk)acrylamidoalkyltrialkyl ammonium halides and (alk)acryloyloxyalkyl trialkyl ammonium halides. Preferably, the aforementioned cationic monomers comprise 6 to 25 carbon atoms, more preferably 7 to 20 carbon atoms, most preferably 7 to 15 carbon atoms and in particular 8 to 12 carbon atoms.

Preferably, the radically polymerizable cationic monomer is a monomer according to general formula (I) as defined supra. The radically polymerizable cationic monomer according to general formula (I) may be an amide (A=NH), e.g., dimethylaminopropyl acrylamide quaternized with methylchloride (DIMAPA quat). Preferably, however, the radically polymerizable cationic monomer according to general formula (I) is an ester (A=O), particularly dimethylaminoethyl(meth)acrylate quaternized with methylchloride (ADAME quat.).

When the first cationic polymer is also derived form an (alk)acrylic acid derivative, said (alk)acrylic acid derivative may be different from or identical with the radically polymerizable cationic monomer contained in the water-in-oil monomer dispersion. Preferably, both monomers differ from one another so that the repetition units of the second cationic polymer differ from the repetition units of the first cationic polymer. Thus, the first cationic polymer and the second cationic polymer preferably differ from each other, said difference possibly involving physical variables such as different molecular weight and/or chemical structure, as well as different monomer composition and/or monomer ratio.

Preferably, the water-in-oil monomer dispersion according to the invention further comprises one or more radically polymerizable, ethylenically unsaturated co-monomers. Under these provisions, the second cationic polymer yielded in step (b) of the process according to the invention is no homopolymer, but a copolymer or, e.g., a terpolymer. Preferably, the ethylenically unsaturated co-monomer is water-soluble, preferably non-ionic. Preferably, the content of the one or more ethylenically unsaturated co-monomers is within the range of from 1.0 to 90 wt.-%, more preferably 2.5 to 75 wt.-%, still more preferably 5 to 60 wt.-%, yet more preferably 10 to 50 wt.-%, most preferably 20 to 40 wt.-% and in particular 25 to 35 wt.-%, based on the total weight of the water-in-oil monomer dispersion.

Suitable ethylenically unsaturated co-monomers include compounds of general formula (II) and amphiphilic compounds of general formula (III), as defined supra. Preferably, the one or more ethylenically unsaturated co-monomers comprise (alk)acrylamide, more preferably acrylamide.

In a preferred embodiment, when the water-in-oil monomer dispersion contains one or more ethylenically unsaturated co-monomers, the content of the radically polymerizable cationic monomer is within the range of from 0.1 to 50 mol.-%, more preferably 1.0 to 40 mol.-%, still more preferably 2.0 to 30 mol.-%, yet more preferably 3.0 to 20 mol.-%, most preferably 5.0 to 15 mol.-% and in particular 8.0 to 12 mol.-%, based on the total amount of the radically polymerizable cationic monomer and the radically polymerizable, ethylenically unsaturated co-monomers.

In a preferred embodiment, the water-in-oil monomer dispersion contains a cationic radically polymerizable cationic monomer and one or more non-ionic ethylenically unsaturated co-monomers. Preferably, the content of the cationic radically polymerizable cationic monomer (corresponding to the cationicity of the resultant second cationic polymer, $+_{SCP}$) is within the range of from 0.1 to 75 wt.-%, more preferably 1.0 to 65 wt.-%, still more preferably 2.0 to 55 wt.-%, yet more preferably 5.0 to 45 wt.-%, most preferably 10 to 40 wt.-% and in particular 15 to 35 wt.-%, based on the total amount of the cationic radically polymerizable cationic monomer and the non-ionic radically polymerizable, ethylenically unsaturated co-monomers, i.e. preferably based on the total weight of the resultant second cationic polymer.

In a preferred embodiment, the cationicity of the second cationic polymer in wt.-% ($+_{SCP}$) is 40±30 wt.-%, more preferably 40±25 wt.-%, still more preferably 40±20 wt.-%, yet more preferably 40±15 wt.-%, most preferably 40±10 wt.-%, and in particular 40±5 wt.-%, based on the total weight of the second cationic polymer. In another preferred embodiment, the cationicity of the second cationic polymer in wt.-% ($+_{SCP}$) is 50±30 wt.-%, more preferably 50±25 wt.-%, still more preferably 50±20 wt.-%, yet more preferably 50±15 wt.-%, most preferably 50±10 wt.-%, and in particular 50±5 wt.-%, based on the total weight of the second cationic polymer. In still another preferred embodiment, the cationicity of the second cationic polymer in wt.-% ($+_{SCP}$) is 60±30 wt.-%, more preferably 60±25 wt.-%, still more preferably 60±20 wt.-%, yet more preferably 60±15 wt.-%, most preferably 60±10 wt.-%, and in particular 60±5 wt.-%, based on the total weight of the second cationic polymer.

Preferably, the radical reactivity ratios of the radically polymerizable cationic monomer $r_1$ and of the radically polymerizable, ethylenically unsaturated co-monomer $r_2$ are each within the range of from 0.01 to 100, more preferably 0.02 to 50, still more preferably 0.05 to 20, most preferably 0.1 to 10 and in particular 0.2 to 5. In this context, $r_1$ is defined as the ratio of two propagation constants involving a radical of the radically polymerizable cationic monomer: The ratio always compares the propagation constant for the monomer of the same type adding to the radical ($k_{11}$) relative to the propagation constant for the addition of the co-monomer ($k_{12}$), i.e., $r_1{=}k_{11}/k_{12}$. In analogy, $r_2{=}k_{22}/k_{21}$. For further details it can be referred e.g. to Paul C. Hiemenz, Polymer Chemistry, Marcel Dekker New York, 1984, Chapter 7.2.

In a particularly preferred embodiment of the water-in-oil monomer dispersion according to the invention,
  the oily substance is an aliphatic hydrocarbon containing 6 to 30 carbon atoms;
  the first cationic polymer is derived from one or more monomers comprising an (alk)acrylamidoalkyltrialkyl ammonium halide;
  the radically polymerizable cationic monomer is an (alk)acryloyloxyalkyl trialkyl ammonium halide; and/or
  the radically polymerizable, ethylenically unsaturated co-monomers comprise an (alk)acrylamide.

In step (a) of the process according to the invention a water-in-oil monomer dispersion is prepared which comprises water, an oily substance, a water-in-oil emulsifier, a first cationic polymer, a radically polymerizable cationic monomer, and optionally one or more radically polymerizable, ethylenically unsaturated co-monomers.

The preparation of water-in-oil monomer dispersions is known to the skilled person. The components may be added simultaneously or consecutively. Preferably, the aqueous phase and the oil phase are prepared separately from one another and afterwards, are combined in order to yield the water-in-oil monomer dispersion.

The components may be added by conventional means, e.g. by pouring or dropping liquids, by dosing powders, and the like.

Preferably, the aqueous phase comprises a homogeneous solution of water, the first cationic polymer, the radically polymerizable cationic monomer, and the radically polymerizable, ethylenically unsaturated co-monomers, if any. Prior to combining the aqueous phase and the oil phase, further components may be added to the aqueous phase, such as chelating agents, buffers (acids and/or bases), branching agents, cross-linkers, chain transfer agents, and the like.

Suitable branching agents, cross-linkers and chain transfer agents are known to the skilled person. Preferably, however, no branching agents, cross-linkers or chain transfer agents are added.

Preferably, the pH of the aqueous phase is adjusted to a value within the range of from 1.0 to 5.0, more preferably 1.5 to 4.5, still more preferably 2.0 to 4.0, and most preferably 2.5 to 3.5. The pH value may be adjusted by means of suitable acids and bases, respectively. Preferred acids are organic acids and mineral acids, such as formic acid, acetic acid, hydrochloric acid and sulfuric acid.

Preferably, the oil phase comprises a homogeneous solution of the oily substance and the water-in-oil emulsifier. Prior to combining the aqueous phase and the oil phase, further components may be added to the oil phase, such as further anionic, cationinc, zwitterionic or non-ionic surfactants or polymer emulsifiers, and the like.

Preferably, the aqueous phase is added to the oil phase under vigorous stirring which may be effected, e.g., by a high-speed mixer, homogenizer, and the like.

In principle, it is not necessary that the entire amount of each component is initially present when the water-in-oil monomer dispersion is prepared in step (a) of the process according to the invention. Alternatively, complete or partial dispersion of the monomers or monomer solution in the first cationic polymer can be effected at the beginning of the polymerization, the remainder of the monomers or monomer solution being added as metered portions or as a continuous feed distributed over the entire course of polymerization. For example, only a certain portion of a particular component, e.g., only 70 wt.-% of the radically polymerizable cationic monomer, may be initially employed in step (a), and thereafter, possibly in the course of step (b), the remainder of said particular component, e.g., the residual 30 wt.-% of the radically polymerizable cationic monomer, is employed.

After the water-in-oil monomer dispersion has been prepared in step (a) of the process according to the invention, in step (b) the radically polymerizable cationic monomer and the optionally present one or more radically polymerizable, ethylenically unsaturated co-monomers are radically polymerized thereby yielding the second cationic polymer.

Step (b) is preferably performed as an inverse emulsion polymerization, e.g., in a water-in-oil emulsion. In this inverse emulsion polymerization process, the resultant inverse polymer emulsion contains a dispersed aqueous phase containing the second cationic polymer, and a continuous oil phase formed of the inert oily substance.

The skilled person knows how to radically polymerize a water-in-oil monomer dispersion. Typically, the polymerization reaction according to step (b) is carried out in the presence of one ore more conventional polymerization initiators.

Radicals may be formed, e.g., upon thermally induced or photochemically induced homolysis of single bonds or redox reactions.

Examples of suitable water-soluble initiators include, e.g., 2,2'-azobis-(2,4-dimethylvaleronitrile), 2,2'-azobis-(2-amidinopropane)dihydrochloride, 4,4'-azobis-(4-cyanopentanoic acid), or redox systems such as ammonium persulfate/ferric sulfate. Oil-soluble initiators include, e.g., dibenzoyl peroxide, dilauryl peroxide or tert-butyl peroxide, or azo compounds such as 2,2'-azobisisobutyronitrile, dimethyl 2,2'-azobisisobutyrate and 2,2'-azobis-(4-methoxy-2,4-dimethylvaleronitrile). The initiators may be used either individually or in combinations and generally in an amount of about 0.005 to 0.5% by weight of the total weight of the water-in-oil monomer dispersion. The skilled person principally knows how to modify the amount and type of the initiator in order to modify the properties of the resultant polymer product, e.g., its average molecular weight.

Preferably, azo compounds such as 2,2'-azobisisobutyronitrile, 2,2'-azobis(2-aminopropane)dihydrochloride or preferably potassium persulfate, ammonium persulfate, hydrogen peroxide, optionally in combination with a reducing agent, e.g. an amine or sodium sulfite, are used as radical initiators. The amount of initiator, relative to the monomers to be polymerized, generally ranges from $10^{-3}$ to 1.0 wt.-%, preferably from $10^{-2}$ to 0.1 wt.-%. The initiators can be added completely or also only in part at the beginning of the polymerization, with subsequent apportioning of the residual amount over the entire course of polymerization. In a preferred embodiment, the polymerization is initiated by means of an azo initiator and, after reaching the maximum temperature, continued with a redox initiator system to reduce the content of residual monomers.

In another advantageous embodiment, once the exothermic polymerization reaction is complete, i.e. generally after the temperature maximum, the content of residual monomers is further reduced by subsequent addition of redox initiator.

In another advantageous embodiment of the invention, both monomer and first cationic polymer are apportioned into the polymerization reactor during polymerization. In general, a portion, e.g. 10 to 20% of the monomers and the first cationic polymer, is initially introduced. Following initiation of polymerization, the above-mentioned apportioning is effected, optionally accompanied by further apportioning of polymerization initiator.

In addition, it is also possible to remove oil and/or water during and/or after polymerization and optionally to add further polymer. As evaporation is rather energy consuming, however, the content of water and the oily substance in the water-in-oil monomer dispersion is preferably optimized so that only minor amounts, if any, are evaporated after polymerization.

The polymerization temperature generally is 0 to 120° C., preferably 30 to 90° C., more preferably 50 to 70° C. The polymerization temperature can be selected based on the decomposition kinetics of the initiator used. The polymerization, is preferably carried out in such a way that the system is purged with an inert gas and polymerized under an inert gas atmosphere, e.g. under a nitrogen atmosphere. Polymerization conversion or the end of polymerization can easily be detected by determining the content of residual monomers. Methods for this purpose are familiar to those skilled in the art.

Polymerization may be performed adiabatically or isothermally.

Polymerization times are the same as those conventionally used in the art, generally 0.5 to 3 hours and preferably 1 to 2.5 hours, although as little as one-half hour could be used. However, attempting more rapid polymerization over a shorter period of time creates problems with removing heat. In this regard it is greatly preferred that the polymerization medium be stirred well or otherwise agitated during the polymerization.

The equipment utilized for the polymerization can simply be standard reactors such as used for oil-in-water or water-in-oil emulsion polymerizations.

Following polymerization, it can be advantageous to cool down the reaction mixture before optionally adding further additives, such as salts or acids, to the dispersion, preferably with stirring.

To reduce the residual monomer content, it is also possible to increase the temperature during the course of the polymerization. Alternatively, it is also possible to use additional initiators during and at the end of the polymerization and/or residual monomer destructors.

Residual monomer destructors within the meaning of the invention are substances that modify polymerizable monomers by means of a chemical reaction in such a way that they are no longer polymerizable, such that within the meaning of the invention they are no longer monomers. Substances that react with the double bond present in the monomers and/or substances that can initiate a more extensive polymerization can be used for this purpose. As residual monomer destructors that react with the double bond, reducing agents can for example be used, preferably substances from the group of acids and neutral salts of acids derived from sulphur having an oxidation number lower than VI, preferably sodium dithionite, sodium thiosulphate, sodium sulphite or sodium disulphite, and/or substances having a hydrogen sulphide group, preferably sodium hydrogen sulphide or compounds from the group of thiols, preferably mercaptoethanol, dodecyl mercaptan, thiopropionic acid or salts of thiopropionic acid or thiopropanesulphonic acid or salts of thiopropanesulphonic acid, and/or substances from the group of amines, preferably from the group of amines with low volatility, preferably diisopropanolamine or aminoethyl ethanolamine, and/or substances from the group comprising Bunte salts, formamidine sulphinic acid, sulphur dioxide, aqueous and organic solutions of sulphur dioxide, hydroxylammonium sulphate, or thio urea.

Preferably, the water-in-oil polymer dispersion has a residual content of radically polymerizable cationic monomer of at most 5,000 ppm, more preferably at most 2,500 ppm, still more preferably at most 1,000 ppm, yet more preferably at most 800 ppm, most preferably at most 600 ppm an in particular at most 400 ppm. In a preferred embodiment, the water-in-oil polymer dispersion has a residual content of radically polymerizable cationic monomer of at most 200 ppm, more preferably at most 100 ppm, still more preferably at most 75 ppm, yet more preferably at most 50 ppm, most preferably at most 30 ppm an in particular at most 20 ppm.

Preferably, the water-in-oil polymer dispersion has a residual content of radically polymerizable, ethylenically unsaturated co-monomers of at most 5,000 ppm, more preferably at most 2,500 ppm, still more preferably at most 1,000 ppm, yet more preferably at most 800 ppm, most preferably at most 600 ppm an in particular at most 400 ppm.

Step (b) of the process according to the invention transforms the water-in-oil monomer dispersion into a water-in-oil polymer dispersion.

After and/or during the polymerization reaction in step (b), the resultant water-in-oil polymer dispersion may be distillated in order to reduce the content of the solvent.

In a preferred embodiment, the process according to the invention comprises the steps of
(a) preparing a water-in-oil monomer dispersion containing
water,
an oily substance,
a water-in-oil emulsifier,
a first cationic polymer having a weight average molecular weight $M_w$ of from 75,000 to 350,000 g/mol and being synthesised from
30 to 95 wt.-% of (alk)acrylamidoalkyltrialkyl ammonium halides, (alk)acryloyloxyalkyl trialkyl ammonium halides, alkenyl trialkyl ammonium halides and/or dialkenyl dialkyl ammonium halides, and
5 to 70 wt.-% of nonionic ethylenically unsaturated co-monomers, preferably acrylamide,
based on the total weight of monomers, and
a monomer mixture of
1 to 99 wt.-%, preferably 1 to 60 wt.-% of (alk)acrylamidoalkyltrialkyl ammonium halides, (alk)acryloyloxyalkyl trialkyl ammonium halides, alkenyl trialkyl ammonium halides and/or dialkenyl dialkyl ammonium halides, and
1 to 99 wt.-%, preferably 40 to 99 wt.-% of nonionic ethylenically unsaturated co-monomers, preferably acrylamide;
based on the total weight of monomers, and
(b) adding a radical initiator, thereby performing a radical polymerization of the monomer mixture.

A further aspect of the invention relates to a water-in-oil polymer dispersion comprising water, an oily substance, an emulsifier, a first cationic polymer, and a second cationic polymer, the dispersion being obtainable by the process described above.

The water-in-oil polymer dispersions according to the invention are characterized by a relatively low content of first cationic polymer having a relatively low cationicity. Thus, the contribution of the first cationic polymer to the cationicity of the overall water-in-oil polymer dispersion is comparatively low.

It has been surprisingly found that the water-in-oil polymer dispersions according to the invention are excellent flocculants. For example, they show a better ash retention performance as well as shorter retention times in paper manufacture compared to conventional compositions.

The water-in-oil polymer dispersions according to the invention may be water-in-oil polymer suspensions or water-in-oil polymer emulsions or mixtures thereof.

Preferably, the preferred embodiments concerning the oily substance, water, first cationic polymer, water-in-oil emulsifier and/or of the further constituents of the water-in-oil monomer dispersion (content, relative ratio, chemical nature, etc.) also apply to the water-in-oil polymer dispersion according to the invention.

In a particularly preferred embodiment, the cationicity of first cationic polymer+$_{FCP}$ (content of cationic monomer(s) in wt.-% based on the total weight of the first cationic polymer), the content of first cationic polymer $C_{FCP}$ (in wt.-% based on the total weight of the polymer dispersion), the cationicity of second cationic polymer+$_{SCP}$ (content of cationic monomer(s) in wt.-% based on the total weight of the second cationic polymer) and the content of the second cationic polymer $C_{SCP}$ (in wt.-% based on the total weight of the polymer dispersion) satisfy the following requirement:

$$X = \frac{+_{SCP} \cdot C_{SCP}}{+_{FCP} \cdot C_{FCP}}, \text{ where } 0.5 \leq X \leq 300.$$

Preferred ranges $R_1$ to $R_{10}$ for X are summarized in the table here below:

| A ≤ X ≤ B | A | B |
|---|---|---|
| $R_1$ | 0.7 | 270 |
| $R_2$ | 1.0 | 215 |
| $R_3$ | 1.3 | 150 |
| $R_4$ | 1.7 | 100 |
| $R_5$ | 2.0 | 80 |
| $R_6$ | 2.3 | 60 |
| $R_7$ | 2.7 | 50 |
| $R_8$ | 3.0 | 40 |
| $R_9$ | 3.3 | 35 |
| $R_{10}$ | 3.7 | 30 |

The water-in-oil polymer dispersions according to the invention are, as a rule, self-inverting, i.e. a phase inversion occurs when the emulsion is poured into water and the polymers present in the dispersion dissolves in water. The phase inversion can, however, be accelerated by adding wetting agents (=inverters). These wetting agents can be added to the water-in-oil polymer dispersion or can be added to the water into which the dispersion is introduced.

Preferably, the wetting agent has a HLB (hydrophilic-lipophilic balance) value within the range of from 7 to 16, more preferably 8 to 15, still more preferably 9 to 14, most preferably 9.5 to 13.5 and in particular 10 to 13. Preferably, the content of the wetting agent is within the range of from 0.005 to 25 wt.-%, more preferably 0.01 to 10 wt.-%, still more preferably 0.1 to 7.5 wt.-%, yet more preferably 0.5 to 5.0 wt.-%, most preferably 1.0 to 4.0 wt.-% and in particular 1.5 to 3.5 wt.-%, based on the total weight of the water-in-oil polymer dispersion.

Preferred wetting agents for inverting the water-in-oil polymer dispersion are ethoxylated alkylphenols having a degree of ethoxylation between 5 to 20 or ethoxylate fatty alcohols of 10 to 22 carbons, having a degree of ethoxylation between 5 and 20. The water-in-oil polymer dispersions may contain up to 10% by weight, based on the total dispersion, of the wetting agent having an HLB value of more than 9, preferably at least 10. Examples of suitable wetting agents having an HLB value greater than 10 are ethoxylared alkylphenols, dialkyl esters of sodium sulfosuccinates in which the alkyl group is of not less than 3 carbon atoms, soaps which are derived from fatty acids of 10 to 22 carbon atoms, and alkali metal salts of alkyl- or alkenylsulfates of 10 to 26 carbon atoms. Ethoxylated fatty alcohols and ethoxylated amines are also suitable. If the wetting agents are used in the polymerization itself, particularly finely divided water-in-oil polymer dispersions may be obtained.

In a particularly preferred embodiment, the chemical nature of the second emulsifier that may be present in the water-in-oil monomer dispersion during polymerization is identical to the wetting agent that is added to the water-in-oil polymer dispersion after the polymerization.

In a preferred embodiment, the composition of the water-in-oil polymer dispersion corresponds to the composition of the water-in-oil monomer dispersion that has been subjected to radical polymerization, i.e. the monomers have been polymerized but all other inert constituents are present in identical amounts. In another, less preferred embodiment, solvent (water and/or oily substance) is partially evaporated subsequent to the polymerization reaction.

Preferably, the water-in-oil polymer dispersion according to the invention has a water content within the range of from 5.0 to 45 wt.-%, more preferably 10 to 40 wt.-%, still more preferably 15 to 35 wt.-%, yet more preferably 20 to 30 wt.-%, most preferably 22 to 29 wt.-% and in particular 24 to 28 wt.-%.

In a particularly preferred embodiment, the water content of the water-in-oil polymer dispersions according to the invention is close to the limit at which the water-in-oil polymer dispersion is inverted into an oil-in-water polymer dispersion. Preferably, self-inversion takes place when at least 100 wt.-%, more preferably at least 75 wt.-%, still more preferably at least 50 wt.-%, yet more preferably at least 30 wt.-%, most preferably at least 20 wt.-% and in particular at least 10 wt.-% of water are added, based on the total weight of the water-in-oil polymer dispersion.

In a preferred embodiment of the water-in-oil polymer dispersion according to the invention the weight average molecular weight $M_w$ of the second cationic polymer is higher than the weight average molecular weight $M_w$ of the first cationic polymer. The skilled person knows how to measure and to influence the weight average molecular weight of the second cationic polymer, e.g. by modifying the initiator concentration, the addition of chain-transfer agents, and the like. Preferably, the weight average molecular weight is determined by gelpermeation chromatography (GPC), preferably using 1.5% formic acid as eluent versus pullulan standards, or rheological measurements.

Preferably, the second cationic polymer exhibits a degree of polymerization of at least 90%, more preferably at least 95%, still more preferably at least 98%, yet more preferably at least 99%, most preferably at least 99.5% and in particular at least 99.9%.

Preferably, the weight average molecular weight of the second cationic polymer is at least 1,000,000 g mol$^{-1}$, more preferably at least 1,250,000 g mol$^{-1}$, still more preferably at least 1,500,000 g mol$^{-1}$, yet more preferably at least 1,750,000 g mol$^{-1}$, most preferably at least 2,000,000 g mol$^{-1}$ and in particular at least 2,500,000 g mol$^{-1}$.

Preferably, the weight average molecular weight of the second cationic polymer is higher than the weight average molecular weight of a polymer that is obtained under exactly the same conditions but in the absence of any oily substance (solution polymerization in contrast to inverse emulsion polymerization).

Preferably, the molecular weight dispersity $M_w/M_n$ of the second cationic polymer is within the range of from 1.0 to 4.0, more preferably 1.5 to 3.5 and in particular 1.8 to 3.2.

Preferably, the content of the second cationic polymer ($C_{SCP}$) is within the range of from 1.0 to 90 wt.-%, more preferably 5.0 to 80 wt.-%, still more preferably 15 to 65 wt.-%, yet more preferably 25 to 60 wt.-%, most preferably 30 to 55 wt.-% and in particular 35 to 50 wt.-%, based on the total weight of the water-in-oil polymer dispersion.

Preferably, the relative weight ratio of the second cationic polymer to the first cationic polymer is within the range of from 50:1 to 0.1:1, more preferably 30:1 to 0.5:1, still more preferably 20:1 to 1:1, yet more preferably 10:1 to 2:1, most preferably 8:1 to 5:1 and in particular 7:1 to 6:1.

Preferably, the weight average molecular weight $M_w$ of the polymer mixture present in the water-in-oil polymer dispersion, comprising the second cationic polymer and the first cationic polymer, is in a range above $1.5 \cdot 10^6$ g/mol, as measured according to the GPC method.

Preferably, the second cationic polymer is water-soluble or water-swellable.

Preferably, the water-in-oil polymer dispersion according to the invention has a solution viscosity (according to Brookfield) within the range of from 3,000 to 20,000 mPas, more preferably 4,000 to 18,000 mPas, still more preferably 5,000 to 16,000 mPas, most preferably 6,000 to 14,000 mPas and in particular 7,000 to 9,000 mPas, in 1 wt.-% aqueous dispersion; and/or a salt viscosity of at least 750 mPas, more preferably at least 1,000 mPas, still more preferably at least 1,250 mPas, most preferably at least 1,500 mPas and in particular at least 1,750 mPas.

Preferred embodiments A to D of the water-in-oil polymer dispersion according to the invention are summarized in the table here below:

| component | A | B | C | D |
|---|---|---|---|---|
| oily substance | hydrophobic liquid | hydrocarbon | aliphatic hydrocarbon | $C_{10}$-$C_{22}$ aliphatic hydrocarbon |
| water-in-oil emulsifier | HLB 2-9 | non-ionic surfactant, HLB 2-9 | non-ionic surfactant, HLB 3-8 | sorbitan fatty acid ester |
| first cationic polymer derived from | cationic water-soluble monomer | monomer according to formula (I) | (alk)acrylamidoalkyl trialkyl ammonium halide | DIMAPA quat. |
| second cationic polymer derived from a) + b): | | | | |
| a) (alk)acrylic acid derivative | cationic water-soluble monomer | monomer according to formula (I) | (alk)acryloyloxyalkyl trialkyl ammonium halide | ADAME quat. |
| b) ethylenically unsaturated co-monomer | non-ionic water-soluble ethylenically unsaturated co-monomer | compound of general formula (II) | (alk)acrylamide | acrylamide |

Preferred variants 1 to 6 of the embodiments A to D are summarized in the table here below:

| component [wt.-%] | 1 | 2 | 3 | 4 | 5 | 6 |
|---|---|---|---|---|---|---|
| water | 5-45 | 10-40 | 15-35 | 20-30 | 22-29 | 24-28 |
| oily substance(s) | 0.1-60 | 1.0-55 | 2.5-50 | 5.0-45 | 10-40 | 15-35 |
| water-in-oil emulsifier(s), HLB 2-9 | 0.01-25 | 0.1-10 | 0.5-5.0 | 1.0-4.0 | 1.5-3.5 | 1.8-3.0 |
| first cationic polymer(s) | 0.01-30 | 0.1-20 | 0.5-15 | 1.0-10 | 3.0-8.0 | 4.5-6.5 |
| second cationic polymer derived from | | | | | | |
| (alk)acrylic acid derivative(s) | 0.1-30 | 0.5-25 | 1.0-20 | 2.5-17.5 | 5.0-15 | 7.5-12.5 |
| ethylenically unsaturated co-monomer(s) | 1.0-90 | 2.5-75 | 5-60 | 10-50 | 20-40 | 25-35 |

In the above table, all percentages are based on the total weight of the water-in-oil polymer dispersion.

Preferred components of the water-in-oil polymer dispersion and their respective content result from the following combinations of embodiments A to D with variants 1 to 6: $A^1$, $A^2$, $A^3$, $A^4$, $A^5$, $A^6$, $B^1$, $B^2$, $B^3$, $B^4$, $B^5$, $B^6$, $C^1$, $C^2$, $C^3$, $C^4$, $C^5$, $C^6$, $D^1$, $D^2$, $D^3$, $D^4$, $D^5$, and $D^6$. For example, "$C^4$" means a combination of embodiment C with variant 4, i.e., a water-in-oil polymer dispersion containing 25-75 wt.-% water, 5.0-45 wt.-% of at least one aliphatic hydrocarbon, 3.0-9.0 wt.-% of at least one non-ionic surfactant having a HLB value of 3-8, 6.0-13 wt.-% of at least one first cationic polymer derived from (alk)acrylamidoalkyl trialkyl ammonium halide, and at least one second cationic polymer derived from a) 2.5-17.5 wt.-% of at least one (alk)acryloyloxyalkyl trialkyl ammonium halide and from b) 10-50 wt.-% of at least one (alk)acrylamide, wherein all percentages are based on the total weight of the water-in-oil polymer dispersion.

Preferably, the water-in-oil polymer dispersions according to the invention are liquid. In comparison to powders, liquid dispersions are easier to dose. Powders usually require expensive dosing equipment.

Preferably, the overall polymer content of the water-in-oil polymer dispersions according to the invention is at least 20 wt.-%, more preferably at least 30 wt.-%, still more preferably at least 35 wt.-%, yet more preferably at least 40 wt.-%, most preferably within the range of from 40 wt.-% to 65 wt.-% and in particular from 45 wt.-% to 50 wt.-%, based on the total weight of the water-in-oil polymer dispersions.

In a particularly preferred embodiment of the water-in-oil polymer dispersion according to the invention, the relative weight ratio of the overall content of polymer to the overall content of oily substance is within the range of from 10:1 to 0.1:1, more preferably 8:1 to 0.5:1, still more preferably 6:1 to 0.75:1, yet more preferably 4:1 to 1:1, most preferably 3:1 to 1:1 and in particular 2.5:1 to 1.5:1.

Optionally, the water-in-oil polymer dispersions according to the invention may contain further conventional components, e.g. in the form of water-soluble or oil-soluble acids and/or salts. The acid is preferably present in amounts of 0.1 to 3 wt.-% and the salt in amounts of 0.1 to 3 wt.-%, each relative to the overall dispersion, and acid and salt taken together are preferably present in amounts of 5 wt.-% at most, preferably 4 wt.-% at most, relative to the total weight of the dispersion.

Said further conventional components can be added before, during or after polymerization.

Water-soluble organic acids and/or inorganic acids can be present. More specifically, suitable organic water-soluble acids are organic carboxylic acids, sulfonic acids, phosphonic acids, preferably aliphatic or aromatic mono-, di-, polycarboxylic acids and/or hydroxycarboxylic acids, preferably acetic acid, propionic acid, citric acid, oxalic acid, succinic acid, malonic acid, adipic acid, fumaric acid, maleic acid, benzoic acid, especially preferably citric acid, adipic acid and/or benzoic acid. Suitable inorganic acids are water-soluble mineral acids, preferably hydrochloric acid, sulfuric acid, nitric acid and/or phosphoric acid. Very particularly preferred are citric acid, adipic acid, benzoic acid, hydrochloric acid, sulfuric acid and/or phosphoric acid.

Ammonium, alkali metal and/or alkaline earth metal salts, preferably ammonium, sodium, potassium, calcium and/or magnesium salts, can be used as water-soluble salts. Such salts can be salts of an inorganic acid or of an organic acid, preferably of an organic carboxylic acid, sulfonic acid, phosphonic acid, or of a mineral acid. The water-soluble salts are preferably salts of an aliphatic or aromatic mono-, di-, polycarboxylic acid, of a hydroxycarboxylic acid, preferably of acetic acid, propionic acid, citric acid, oxalic acid, succinic acid, malonic acid, adipic acid, fumaric acid, maleic acid or benzoic acid, or sulfuric acid, hydrochloric acid or phosphoric acid. Very particularly preferably, sodium chloride, ammonium sulfate and/or sodium sulfate are used as water-soluble salts. Preferably, however, no further salt is added.

The salts can be added before, during or after polymerization, polymerization preferably being carried out in the presence of a water-soluble salt.

Furthermore, the water-in-oil polymer dispersions according to the invention may contain water-soluble polyfunctional alcohols and/or reaction products thereof with fatty amines in amounts of up to 30 wt.-%, preferably up to 15 wt.-%, and more preferably up to 10 wt.-%, relative to the first cationic polymer. More specifically suitable in this context are polyalkylene glycols, preferably polyethylene glycols, polypropylene glycols, block copolymers of propylene/ethylene oxides, with molecular weights of 50 to 50,000, preferably 1,500 to 30,000, low-molecular weight polyfunctional alcohols such as glycerol, ethylene glycol, propylene glycol, pentaerythritol and/or sorbitol as polyfunctional water-soluble alcohols and/or the reaction products thereof with fatty amines having $C_6$-$C_{22}$ in the alkyl or alkylene residues.

Said water-soluble polyfunctional alcohols and/or reaction products thereof with fatty amines can be added before, during or after polymerization.

Preferably, the water-in-oil polymer dispersions according to the invention show a retention effect according to the standard test method of Technical Association of Pulp and Paper Industry (TAPPI), namely T261pm-79 method (that is, Britt Jar-method), of at least 35% or at least 37.5%, more preferably at least 40% or at least 42.5%, still more preferably at least 45% or at least 47.5%, yet more preferably at least 50% or at least 52.5%, most preferably at least 55% or at least 57.5% and in particular at least 60% or at least 62.5%. In a preferred embodiment, test conditions are modified as in Application Example A-3.

The water-in-oil polymer dispersions according to the invention have several advantages over conventional water-in-water polymer dispersions, e.g.:
- second cationic polymers having a higher molecular weight may be obtained resulting inter alia in improved rheological properties of the water-in-oil polymer dispersions;
- the molar ratio of ionic monomers to non-ionic monomers in the first cationic polymer and/or in the second cationic polymer may be varied within broad limits without significantly deteriorating the essential properties of the water-in-oil polymer dispersions;
- the chemistry of the first cationic polymer is substantially independent from the chemistry of the second cationic polymer; and
- branching agents, cross-linkers and other polymerization auxiliaries may be incorporated without complicating the polymerization process.

The water-in-oil polymer dispersions according to the invention are useful as additives in solid/liquid separation processes, e.g., retention in paper or sludge dewatering in sewage plants. They show improved application performance, especially regarding ash retention in paper retention and dewatering. The water-in-oil polymer dispersions obtainable according to the invention have the unexpected advantage of being excellent auxiliaries in paper making, particularly useful as retention and dewatering agents in paper making.

A further aspect of the invention relates to the use of the water-in-oil polymer dispersion according to the invention as flocculant (flocculating agent), preferably in the manufacture of paper, preferably as retention aid and/or drainage aid.

A further aspect of the invention relates to a process for the manufacture of paper, paperboard or cardboard, the process comprising the step of (ii) adding the water-in-oil polymer dispersion according to the invention to an aqueous cellulosic suspension. Preferably, the process further comprises the step of (i) adding a further polymer to the cellulosic suspension, wherein step (i) is preferably performed prior to step (ii).

Preferably, the process for the manufacture of paper comprises forming a cellulosic suspension, flocculating the suspension, optionally mechanically shearing the suspension and optionally reflocculating the suspension, draining the suspension on a screen to form a sheet and then drying the sheet, wherein the suspension is flocculated and/or reflocculated by introducing the water-in-oil polymer dispersion according to the invention.

It has surprisingly been found that the water-in-oil polymer dispersions according to the invention provide improved performance in terms of improved retention and yet still maintain good drainage and formation performance. The water-in-oil polymer dispersions flocculate the cellulosic fibres and other components of the cellulosic paper making stock more efficiently thus inducing improvements in retention.

In the process for the manufacture of paper according to the invention the water-in-oil polymer dispersion may be added to the paper making stock as the sole treatment agent in the paper making process, although preferably the water-in-oil polymer dispersion may be added as part of a multi-component flocculant system in which the cellulosic suspension is flocculated and then reflocculated.

In one aspect of the invention the cellulosic suspension is flocculated by the water-in-oil polymer dispersion (flocculating agent) and then the cellulosic suspension is reflocculated by a further addition of the water-in-oil polymer dispersion (reflocculating agent) or alternatively, by another flocculating material (reflocculating agent). Optionally, the flocs formed are degraded before being reflocculated, by for instance applying mechanical shear. This can be for instance passing the flocculated cellulosic suspension through one or more shear stages such as a centri-screen or a fan pump etc.

In an alternative form of the invention the cellulosic suspension is flocculated by introducing a flocculating material (flocculating agent) and the cellulosic suspension is reflocculated by introducing the water-in-oil polymer dispersion (reflocculating agent). Optionally the flocs are degraded before reflocculation.

The cellulosic suspension may be flocculated by introducing the flocculating agent into the suspension at any suitable addition point. This may be for instance before one of the pumping stages or prior to the centri-screen or even after the centri-screen. The cellulosic suspension may then be reflocculated at any suitable point after it has been flocculated. The flocculating agent and reflocculating agent may be added in close proximity, for example without any shear stage between the additions. Preferably, there is at least one shear stage (selected from cleaning, pumping and mixing stages) separating the addition of flocculating agent and reflocculating agent. Desirably, when the flocculating agent is applied prior to a shear stage, for instance a fan pump or the centri-screen, the reflocculating agent may be added after that shear stage. This may be immediately after the shear stage or more usually further after. Thus, the flocculating agent may be added prior to a fan pump and the reflocculating agent may be added after the centri-screen.

Accordingly, the water-in-oil polymer dispersion is added as the flocculating agent and/or as the reflocculating agent.

Desirably, the water-in-oil polymer dispersion may be added to the stock at a dose of 5 to 5,000 ppm, more preferably 50 to 2,500 ppm, most preferably 200 to 1,000 ppm, based on solid contents.

When the water-in-oil polymer dispersion is used in a paper making process as part of a multi-component flocculating system, it may be added as the flocculating agent and/or reflocculating agent. According to one preferred aspect of the invention the multi-component flocculating system comprises the water-in-oil polymer dispersion and a different flocculating material. This flocculating material may be any of the group consisting of water soluble polymers, water insoluble polymeric microbeads, particulate uncooked polysaccharides and inorganic materials. Suitable flocculating materials include inorganic materials such as siliceous materials, alum, aluminum chloro hydrate and polyaluminum chloride.

When the flocculating material is a water soluble polymer, it may be any suitable water soluble polymer, for instance biopolymers, such as nonionic, cationic, anionic and amphoteric starches or other polysaccharides. The flocculating material may also be any suitable cationic, anionic, amphoteric or nonionic synthetic water soluble polymer.

The flocculating material may be a siliceous material which is in the form of an anionic microparticulate composition. The siliceous materials include silica based particles, colloidal silica, silica microgels, silica sols, silica gels, polysilicates, aluminosilicates, borosilicates, polyaluminosilicates, polyborosilicates, zeolites and clays. The clays are preferably swelling clays, for instance this may be typically a bentonite type clay. The preferred clays are swellable in water and include clays which are naturally water swellable or clays which can be modified, for instance by ion exchange to render them water swellable. Suitable water swellable clays include but are not limited to clays often referred to as hectorite, smectites, montmorillonites, nontronites, saponite, sauconite, hormites, attapulgites and sepiolites.

Alternatively, the flocculating material is a colloidal silica, selected from polysilicates and polyaluminosilicates. This includes polyparticulate polysilicic microgels of surface area in excess of 1,000 m$^2$/g, for instance water soluble polyparticulate polyalumino silicate microgels or aluminate polysilicic acid. In addition the flocculating material may be a colloidal silicic acid.

The flocculating material may also be a colloidal borosilicate. The colloidal borosilicate may be prepared by contacting a dilute aqueous solution of an alkali metal silicate with a cation exchange resin to produce a silicic acid and then forming a heel by mixing together a dilute aqueous solution of an alkali metal borate with an alkali metal hydroxide to form an aqueous solution containing 0.01 to 30% $B_2O_3$, having a pH of from 7 to 10.5.

The cellulosic stock suspension may comprise a filler. The filler may be any of the traditionally used filler materials. For instance, the filler may be clay such as kaolin, or the filler may be a calcium carbonate which could be ground calcium carbonate or in particular precipitated calcium carbonate, or it may be preferred to use titanium dioxide as the filler material. Examples of other filler materials also include synthetic polymeric fillers. The paper making stock may comprise any suitable amount of filler. Generally, the cellulosic suspension comprises at least 5% by weight filler material. Typically the amount of filler will be up to 40% or higher, preferably between 10% and 40% filler.

The flocculating material used in conjunction with the water-in-oil polymer dispersion, may be an anionic, nonionic, cationic or amphoteric branched water soluble polymer that has been formed from water soluble ethylenically unsaturated monomer or monomer blend. For instance the branched water soluble polymer may exhibit a) an intrinsic viscosity above 1.5 dl/g and/or saline Brookfield viscosity of above about 2.0 mPa·s.

Alternatively, the flocculating material used in conjunction with the water-in-oil polymer dispersion includes cross-linked anionic or amphoteric polymeric micro-particles.

A particularly preferred process employs a multi-component flocculation system comprising as a flocculating agent the water-in-oil polymer dispersion and then as a reflocculating agent an anionic flocculating material. The anionic flocculating material includes siliceous materials such as microparticulate silicas, polysilicates, anionic polymeric microbeads and water soluble anionic polymers, including both linear and branched water soluble polymers.

Preferably, the process for the manufacture of paper according to the invention is for the manufacture of paper having an area weight of at least 15 g/m$^2$, more preferably at least 20 g/m$^2$, still more preferably at least 25 g/m$^2$, yet more preferably at least 30 g/m$^2$, most preferably at least 35 g/m$^2$ and in particular at least 40 g/m$^2$.

In a particularly preferred embodiment of the process for the manufacture of paper, a further polymer is added to the cellulosic suspension, preferably before the water-in-oil polymer dispersion is introduced, i.e. the feed point of said further polymer is preferably located "upstream" on the paper machine with respect to the feed point of the water-in-oil polymer dispersion. The feed point of the further polymer may be for instance before one of the pumping stages or prior to the centri-screen. The further polymer and the water-in-oil polymer dispersion may be added in close proximity, for example without any shear stage between the additions.

Said further polymer may be identical in structure and/or molecular weight distribution with the first cationic polymer that is present in the water-in-oil polymer dispersion and in the presence of which the in situ polymerization reaction is performed. Preferably, however, said further polymer differs from the first cationic polymer that is present in the water-in-oil polymer dispersion. The preferred embodiments of the first cationic polymer described above in connection with the water-in-oil polymer dispersion also apply to said further polymer that is preferably additionally employed in the process for the manufacture of paper.

Preferably, the further polymer is derived (synthesized) from
30 to 95 wt.-% of (alk)acrylamidoalkyltrialkyl ammonium halides, (alk)acryloyloxyalkyl trialkyl ammonium halides, alkenyl trialkyl ammonium halides and/or dialkenyl dialkyl ammonium halides; and 5 to 70 wt.-% of nonionic co-monomers, preferably acrylamide; or
a copolymerizate of epichlorohydrin and dialkylamine.

It has been surprisingly found that when employing the water-in-oil polymer dispersion according to the invention as a flocculating agent in a dual flocculating system, excellent retention and drainage performance, respectively, can be combined with good formation. Usually, retention/drainage performance and formation performance antagonize one another, but surprisingly, the properties of the water-in-oil polymer dispersions according to the invention are advantageous in both regards. The water-in-oil polymer dispersions show significantly improved ash retention, which is a well established measure for retention and drainage performance.

When comparing the water-in-oil polymer dispersions according to the invention with conventional water-in-oil polymer dispersions, which do not contain a first cationic polymer, ash retention values are substantially better.

Further, when comparing the water-in-oil polymer dispersions according to the invention with conventional water-in-water polymer dispersions, which do not contain an oily substance, is substantially improved.

The following examples further illustrate the invention but are not to be construed as limiting its scope.

EXAMPLES

Example 1

Preparation of First Cationic Polymer (Lower Weight Average Molecular Weight)

At first, 343 g DIMAPA quat, 215 g water and 412 g acrylamide were weighed in a 2 L vessel. A pH value of 7 was adjusted using sulphuric acid. Then the monomer solution was sparked with nitrogen for 30 min by stirring at 200 rpm. Subsequently, the aqueous solution was heated up to 65° C. and mercaptoethanol and VA-044 were added into the flask. After reaching $t_{max}$ the product was stirred for 12 min further. Then an additional portion of initiator was given to the product for residual monomer burn out. Now the product was stirred for 2 h at 95° C. After that the final aqueous product was cooled down to 30° C.

Preparation of Second Cationic Polymer (Higher Weight Average Molecular Weight) in the Presence of the First Cationic Polymer in Inverse Emulsion Firstly, the aqueous phase was built. 528 g acrylamide (50 wt %), 0.7 g Versenex 80, 238 g ADAME quat (80 wt %), 68 g water, 0.3 g formic acid (20 wt %) and 170 g of the first cationic polymer were filled into a 2 L beaker. While stirring the pH was adjusted to 3 using sulphuric acid. Then the organic phase was prepared mixing 33 g Zephrym 7053, 14 g Plex 3059 L, 6 g Intrasol FA 1218/5, 247 g paraffin oil and the initiator V-65 in a 2 L beaker. The aqueous phase was added to the organic phase under vigorous stirring. Subsequently, the inverse emulsion was filled into a 2 L glass reaction vessel equipped with an anchor stirrer, thermometer and a distillation device. Now the inverse emulsion was evacuated. The emulsion was heated up to a reaction temperature of 55° C. after 30 min of air stripping. The amount of distillate under negative pressure was 120 ml. After the distillation the vacuum was removed. After reaching the maximum temperature the emulsion was stirred 15 min further. Again vacuum was applied and the vessel was allowed to cool down to 40° C. In order to reduce the monomer content 2 g sodium peroxodisulfate (25 wt %) and 11 g sodium bisulfite (25 wt %) were added under stirring to the inverse emulsion. After some minutes 30 g of the activator (Atpol I 4792) were added under stirring to the final product.

Under the above conditions, three different second cationic polymers A, B and C, respectively, were synthesized:

| product | acrylamide | ADAME-quat | first polymer | product viscosity* | floc value |
|---------|------------|------------|---------------|--------------------|-----------| 
| A | 708 g | 125 g | 170 g | 4000 mPas | 4 s |
| B | 528 g | 238 g | 170 g | 2500 mPas | 4 s |
| C | 350 g | 350 g | 170 g | 3900 mPas | 4 s |

*measured via Brookfield viscometer

Monomers:
DIMAPA quat—acryloyl amidopropyl trimethylammonium chloride (=dimethylaminopropylacrylate, quaternized)
ADAME quat—acryloyl oxyethyl trimethylammonium chloride
Other ingredients:
Versenex 80—chelator
Plex 3059 L—shear stabilizer
Intrasol FA 1218/5—emulsifier
Zephrym 7053—emulsifier
Atpol I 4792—activator
VA-044—initiator
V-65—initiator Example 2

Figure 2:
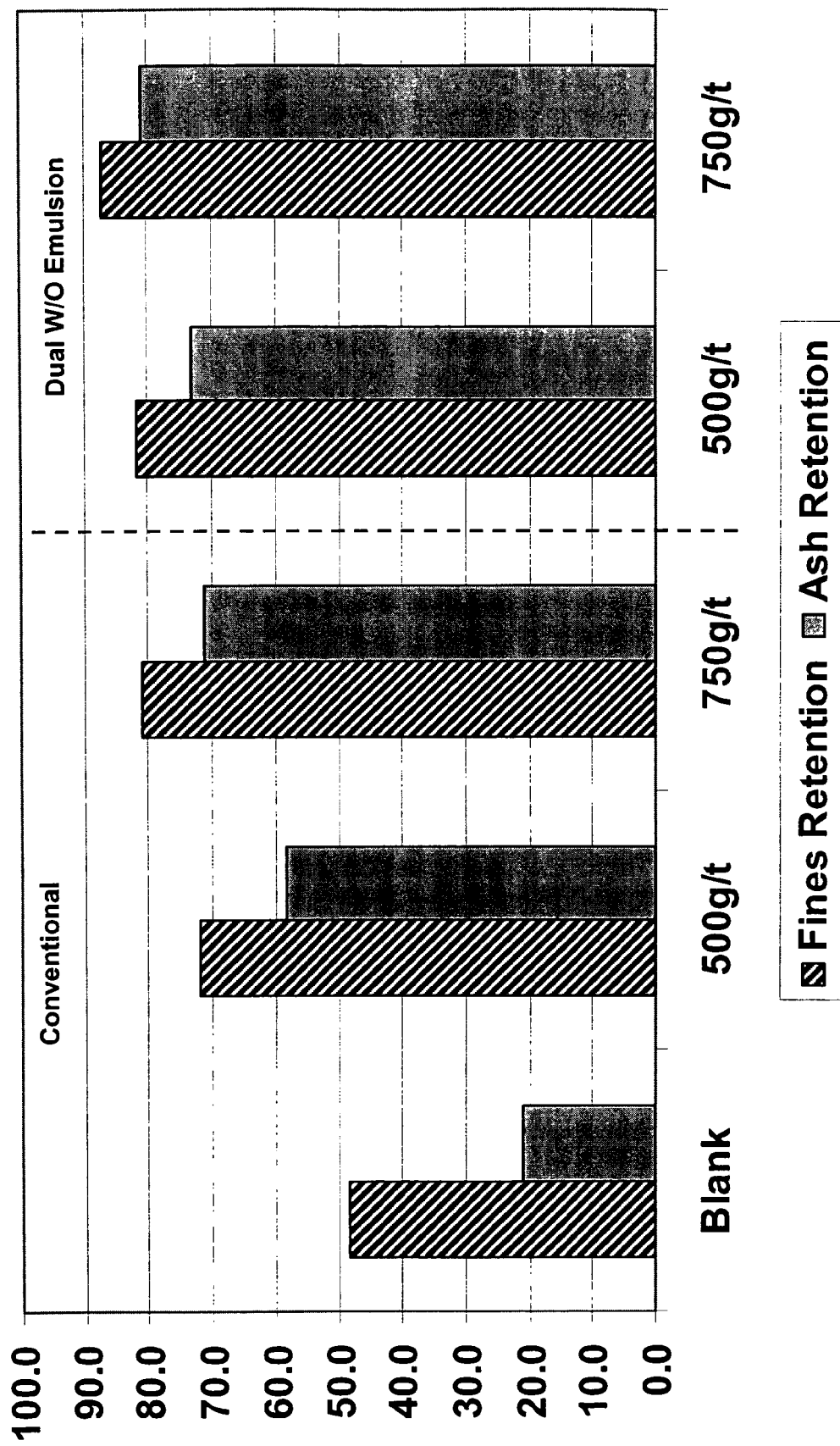
FIG. 2 shows a comparison of fines and ash retention achieved with conventional emulsions vs. the water-in-oil polymer dispersions according to the invention (dual (W/O) emulsions).
Figure 3:
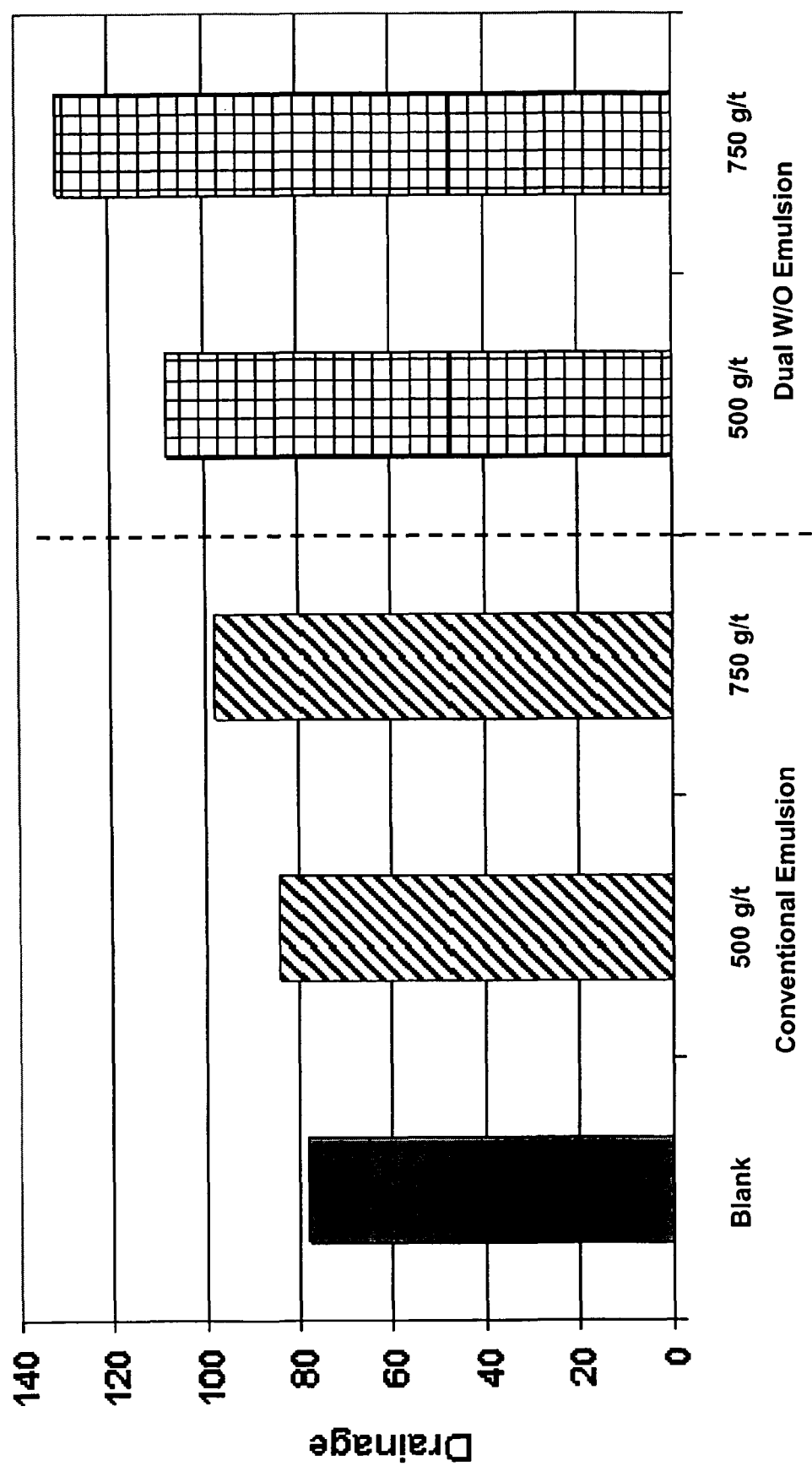
FIG. 3 shows a comparison of drainage achieved with conventional emulsions vs. the water-in-oil polymer dispersions according to the invention (dual (W/O) emulsions).

A laboratory study was performed utilizing stock and white water from a mill producing high quality wall paper. FIGS. 2 and 3 show the results of this study demonstrating increased drainage and retention with the dual polymer technology according to the invention (product B according to example 1) compared to a conventional emulsion polymer with the same charge and molecular weight.

Example 3

Figure 4:
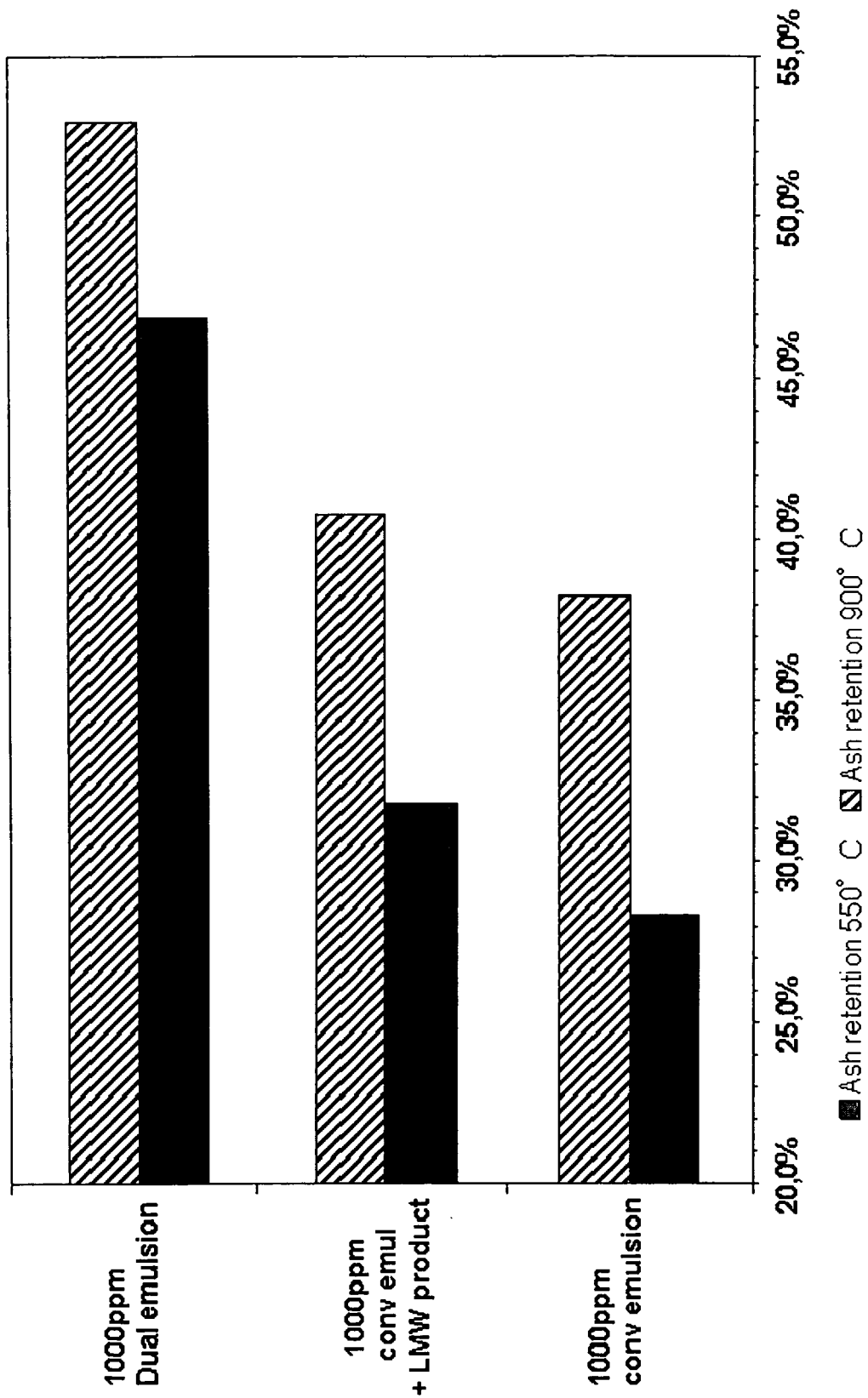
FIG. 4 shows the synergistic increase in ash retention with the water-in-oil polymer dispersions according to the invention (dual (W/O) emulsions).

FIG. 4 illustrates the synergistic benefit of the dual water-in-oil polymer technology according to the invention (product A according to example 1) in a laboratory trial on standard recycled paper with ground calcium carbonate (GCC) as filler. In this laboratory study, 2 lb/t (1 kg/t) of a conventional low charge cationic emulsion flocculant (bottom bars) was dosed and the ash retention recorded. The experiment was repeated and the flocculant supplemented with a dose of a low molecular weight polymer and improved ash retention was observed (middle bars). In the final experiment, both previous components and dosages were held constant, however, the two polymers were applied as a dual product in which the high molecular weight polymer (second cationic polymer) was synthesized in the presence of the low molecular one (first cationic polymer), and a synergistic benefit was observed (top bars).

Example 4

Figure 5:
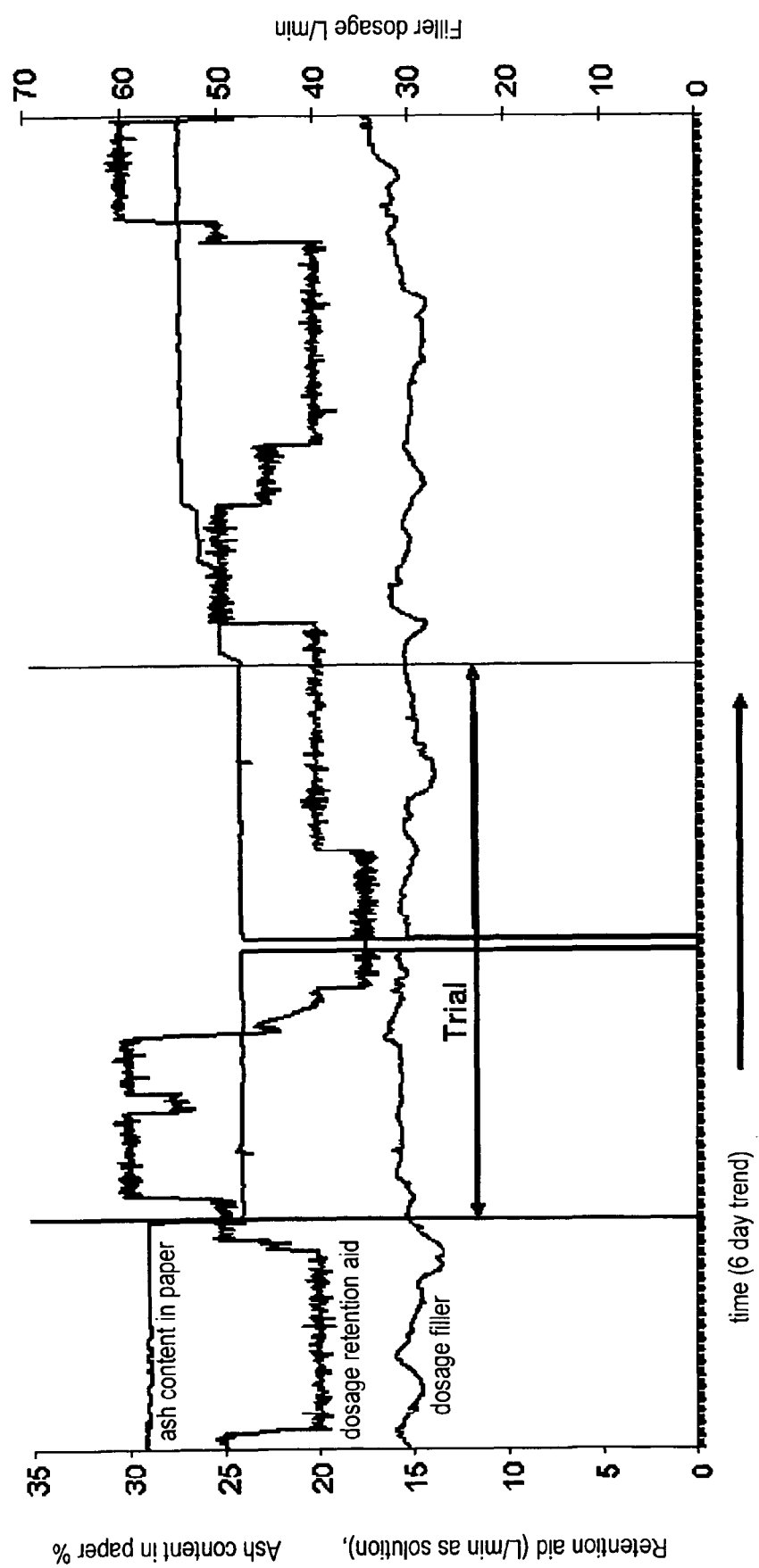
FIG. 5 shows the improved filler efficiency achieved with the water-in-oil polymer dispersions according to the invention (dual (W/O) emulsions). Ash content in paper is monitored in dependence of dosage of filler and retention aid over time.

A newsprint manufacturer producing 286,000 tons/yr (260,000 t/a) on a duo-former machine using DIP:TMP at a ratio of 75:25 employed the dual polymer (product B according to example 1) to reduce the amount of retention aid utilized and to achieve more filler efficiency as shown in FIG. 5.

The above examples demonstrate that the water-in-oil polymer dispersions according to the invention meet the criteria of excellent retention required by papermakers. The products show better results than standard products on ash retention and drainage. In particular, the dual water-in-oil emulsions (W/O) increase ash retention and lead to less product consumption.

The invention claimed is:

1. A process for preparing a water-in-oil polymer dispersion, comprising radically polymerizing a radically polymerizable cationic monomer, and optionally one or more radically polymerizable, ethylenically unsaturated co-monomers, in a water-in-oil monomer dispersion comprising:
water;
an oily substance;
a water-in-oil emulsifier;
a first cationic polymer obtained from a monomer mixture comprising a cationic (alk)acrylic acid monomer and a radically polymerizable ethylenically unsaturated non-ionic monomer, wherein a content of cationic monomers is at most 95 wt.-%, based on a total weight of monomers;
the radically polymerizable cationic monomer, wherein the radical polymerization of the cationic monomer takes place in the presence of the first cationic polymer; and
optionally, a radically polymerizable, ethylenically unsaturated co-monomer,
wherein the radical polymerization polymerizes the radically polymerizable cationic monomer to form a second cationic polymer; and
wherein the water-in-oil dispersion comprises water, the oily substance, the emulsifier and the first and second cationic polymers.

2. The process of claim 1, wherein the cationic (alk)acrylic acid monomer is at least one (alk)acryloyloxyalkyl trialkyl ammonium halide.

3. The process of claim 1, wherein the non-ionic monomer is at least one selected from the group consisting of (meth)acrylamide, N-methyl(meth)acrylamide, N-isopropyl(meth)acrylamide, N,N-dimethyl(meth)acrylamide, N,N-diethyl(meth)acrylamide, N-methyl-N-ethyl(meth)acrylamide, N-hydroxyethyl(meth)acrylamide, N,N-diisopropyl acrylamide, vinylformamide, vinyl acetate and styrene.

4. The process of claim 1, wherein the oily substance is an aliphatic hydrocarbon.

5. The process of claim 1, wherein the radically polymerizable cationic monomer is an (alk)acrylic acid derivative.

6. The process of claim 5, wherein the (alk)acrylic acid derivative is selected from the group consisting of a (alk)acrylamidoalkyltrialkyl ammonium halide, a (alk)acryloyloxyalkyl trialkyl ammonium halide, a alkenyl trialkyl ammonium halide and a dialkenyl dialkyl ammonium halide.

7. The process of claim 1, wherein the process comprises radically polymerizing a radically polymerizable cationic monomer and one or more radically polymerizable, ethylenically unsaturated co-monomers, and the one or more ethylenically unsaturated co-monomers comprise (alk)acrylamide.

8. The process of claim 1, wherein a content of the radically polymerizable cationic monomer is within the range of from 0.1 to 50 mol.-%, based on a total amount of the radically polymerizable cationic monomer and the optionally one or more radically polymerizable, ethylenically unsaturated co-monomers.

9. The process of claim 1, wherein at least one condition is satisfied, selected from the group consisting of: the oily substance is an aliphatic hydrocarbon comprising 6 to 30 carbon atoms; the first cationic polymer is obtained from one or more monomers comprising an (alk)acrylamidoalkyltrialkyl ammonium halide; the radically polymerizable cationic monomer is an (alk)acryloyloxyalkyl trialkyl ammonium halide; and
the radically polymerizable, ethylenically unsaturated co-monomer comprises acrylamide.

10. A water-in-oil polymer dispersion, comprising water, an oily substance, a water-in-oil emulsifier, a first cationic polymer, and a second cationic polymer, wherein the dispersion is obtained by the process of claim 1.

11. The dispersion of claim 10, wherein a weight average molecular weight of the second cationic polymer is higher than a weight average molecular weight of the first cationic polymer.

12. The dispersion of claim 10, wherein a cationicity of the first cationic polymer, $+_{FCP}$ in wt.-%, a content of the first cationic polymer, $C_{FCP}$ in wt.-%, a cationicity of the second cationic polymer, $+_{SCP}$ in wt.-%, and a content of the second cationic polymer, $C_{SCP}$ in wt.-%, satisfy formula (I):

$$X = \frac{+_{SCP} \cdot C_{SCP}}{+_{FCP} \cdot C_{FCP}}, \text{ where } 0.5 \leq X \leq 300. \quad (I)$$

13. The dispersion of claim 10, wherein the dispersion comprises:
10 to 90 wt.-% of water;
0.1 to 60 wt.-% of the oily substance;
0.1 to 25 wt.-% of the water-in-oil emulsifier;
0.1 to 30 wt.-percent of the first cationic polymer; and the second cationic polymer obtained from:
0.1 to 30 wt.-% of at least one radically polymerizable cationic monomer; and
1.0 to 90 wt.-% of at least one radically polymerizable ethylenically unsaturated co-monomer and all percentages are based on a total weight of the dispersion.

14. A flocculant, comprising the water-in-oil polymer dispersion of claim 10.

15. A process comprising adding the water-in-oil polymer dispersion of claim 10 to an aqueous cellulosic suspension.

16. A process for preparing a water-in-oil polymer dispersion, comprising radically polymerizing a radically polymerizable cationic monomer and one or more radically polymerizable, ethylenically unsaturated co-monomers, in a water-in-oil monomer dispersion comprising:
water;
an oily substance;
a water-in-oil emulsifier;
a first cationic polymer obtained from a monomer mixture comprising an (alk)acrylic acid monomer and a non-ionic monomer, wherein a content of cationic monomers is at most 95 wt.-%, based on a total weight of monomers;
the radically polymerizable cationic monomer, wherein the radical polymerization of the cationic monomer takes place in the presence of the first cationic polymer; and
a radically polymerizable, ethylenically unsaturated co-monomer
wherein the radical polymerization forms a second cationic polymer comprising polymerized units of the radically polymerizable cationic monomer and a water-in-oil dispersion comprising water, the oily substance, the water-in-oil emulsifier, the first cationic polymer and the second cationic polymer.

* * * * *